US008562713B2

(12) United States Patent
Guliana et al.

(10) Patent No.: US 8,562,713 B2
(45) Date of Patent: Oct. 22, 2013

(54) FLEXIBLE MINIMUM ENERGY UTILIZATION ELECTRIC ARC FURNACE SYSTEM AND PROCESSES FOR MAKING STEEL PRODUCTS

(75) Inventors: John A. Guliana, Skokie, IL (US); Guy A. Brada, Chicago, IL (US); Christian H. Ericksen, Chicago, IL (US); Bruce C. Liimatainen, Riverside, IL (US); Algirdas A. Underys, Arlington Heights, IL (US)

(73) Assignee: A. Finkl & Sons Co., Chicago, IL (US)

( * ) Notice: Subject to any disclaimer, the term of this patent is extended or adjusted under 35 U.S.C. 154(b) by 0 days.

(21) Appl. No.: 13/134,027

(22) Filed: May 27, 2011

(65) Prior Publication Data

US 2012/0298325 A1 Nov. 29, 2012

(51) Int. Cl.
  C21B 13/12 (2006.01)
  C21C 5/52 (2006.01)
  C21C 7/10 (2006.01)
  C21C 7/072 (2006.01)
  H05B 7/20 (2006.01)

(52) U.S. Cl.
  USPC .............. 75/10.66; 75/512; 75/581; 148/540; 266/208; 266/236; 373/60

(58) Field of Classification Search
  USPC .......... 75/10.66, 512, 581; 148/540; 266/208, 266/236; 373/60
  See application file for complete search history.

(56) References Cited

U.S. PATENT DOCUMENTS

| 5,252,120 | A | * | 10/1993 | Finkl et al. | 75/508 |
| 5,902,371 | A | * | 5/1999 | Frank | 75/10.12 |
| 5,954,855 | A | * | 9/1999 | Gitman et al. | 75/10.42 |
| 6,238,453 | B1 | * | 5/2001 | Rose et al. | 75/10.63 |
| 8,142,541 | B2 | * | 3/2012 | Galewski | 75/380 |

* cited by examiner

Primary Examiner — George Wyszomierski
Assistant Examiner — Tima M McGuthry Banks
(74) Attorney, Agent, or Firm — James G. Staples

(57) ABSTRACT

A combined arc furnace, ladle metallurgical furnace and vacuum degassing system having the flexibility to produce at least non-vacuum arc remelt, vacuum arc remelt, vacuum oxygen decarburized non-vacuum arc remelt, and vacuum oxygen decarburized vacuum arc remelt steels from one off to continuous casting end uses in steady state or randomized order which utilizes only a minimum of energy attributable to preheating hot metal contacting components of the system followed by heat loss reduction of the components and use of a carryover heel in the arc furnace, in which the throughput of the system is limited solely by the melting capacity of the arc furnace.

23 Claims, 18 Drawing Sheets

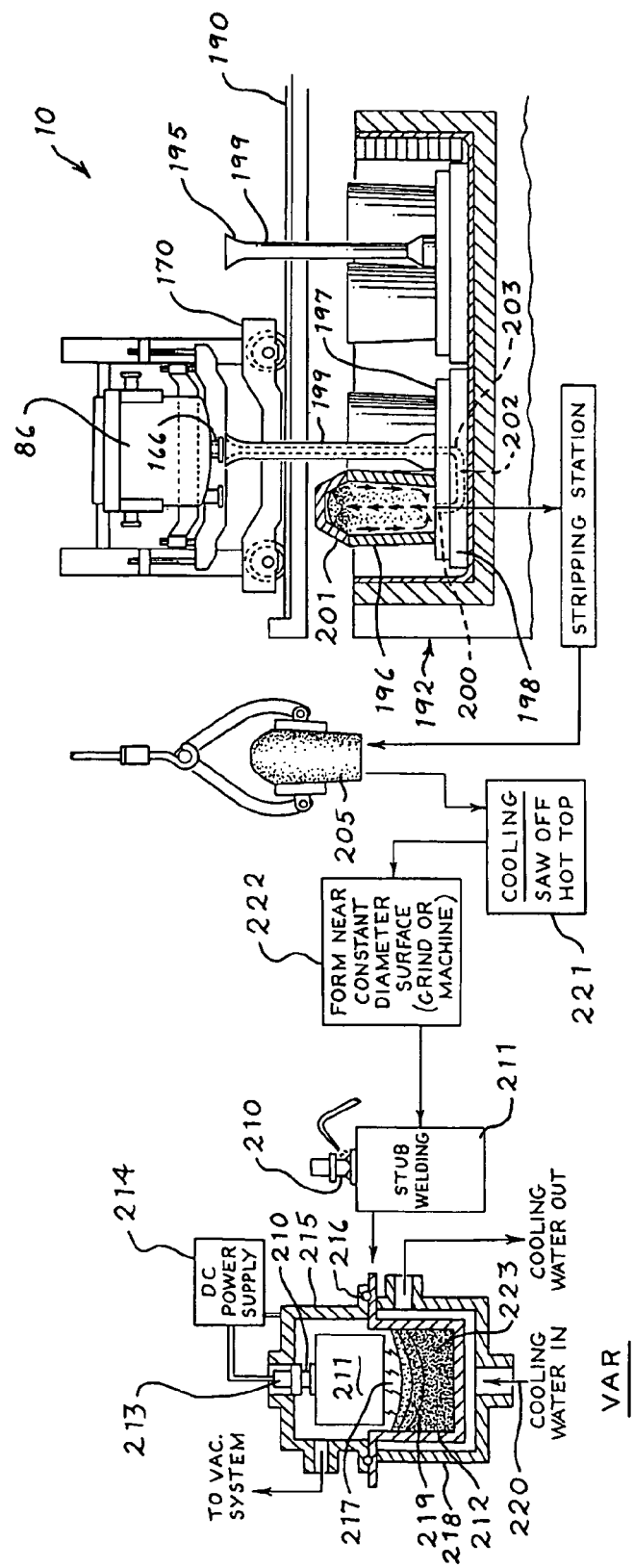

FLEXIBLE MINIMUM ENERGY UTILIZATION ELECTRIC ARC FURNACE SYSTEM AND PROCESSES FOR MAKING STEEL PRODUCTS

BACKGROUND OF THE INVENTION

This invention relates generally to electric arc furnace steel making and specifically to such systems having a ladle metallurgical furnace therein, which systems require decreased energy input per unit of steel produced compared to similar systems. It is particularly directed to making alloy steel at a rate limited only by the maximum melting capacity of the arc furnace. In addition the invention, without modification, is adaptable to nearly every end use found in the steel industry today from continuous casting to unique, one of a kind melts of widely varying compositions in a randomized production sequence.

For example, the invention enables the production of up to four different types of steel (as distinct from grades of steel) in a single electric arc furnace system without slowdown or delay in the processing sequence of heats regardless of the number or randomized order of the different types of steel to be made in a campaign. Thus the system will produce at least non-vacuum arc remelt steel, vacuum arc remelt steel, vacuum oxygen decarburized non-vacuum arc remelt steel and vacuum oxygen decarburized vacuum arc remelt steel.

For some years extending up to about the last decade and a half the vacuum arc degassing system was practiced throughout the world for the production of steel having alloy, gas, grain size and inclusion contents within narrowly defined ranges. In this system steel tapped from an electric arc furnace was thereafter subjected to the combined effects of a low vacuum, a purging gas, and alternating current heating arcs struck between graphite electrodes and the wildly boiling surface of the molten steel while it was subjected to the combined effects of a low vacuum and the purging gas. This system is usually referred to as the vacuum arc degassing system. Millions of tons of steel have been produced by this method and significant tonnage continues to be produced at this date. This method has advantages unachievable by the prior competitive systems including the ability to teem at plus or minus 10° F. at any desired time extending for as long as at least eight hours from furnace tap. Thus a 100 ton ingot could be produced from a system having only one 50 ton arc furnace, and ample time was always available to compensate for planned, or unexpected, downstream delays, thereby avoiding return of a melt to the arc furnace.

However, during normal operations in such systems the production rate or throughput of the system is governed by the processing time in the arc furnace and, in most installations, the processing time for a single heat can be upwards of four to four and one half hours due to the extensive steel making which takes place in the arc furnace; in other words, the steel resides in the arc furnace long after the scrap charge has melted and reached tapping temperature.

With increasing pressures on the steel maker to lower costs and increase throughput using conventional arc furnace technology the lengthy, by comparison, arc furnace steel making technology has had to be abandoned in favor of shorter cycles which achieve the same end result.

For approximately the past 15 years the ladle metallurgical furnace system has begun supplanting traditional arc furnace and vacuum arc degassing steel making technology. In the ladle metallurgical furnace system the arc furnace has been confined to being almost solely a melting unit, with most steel making deferred to downstream operations. For the arc furnace in such a system this has resulted in a much shorter dwell time of the scrap charge in the furnace since raw scrap (and early lime and carbon additions) can be brought to tapping temperature in about two hours, or less, compared to the four to four and one half hours required in conventional arc furnace steel making in the same size furnace. The use of larger electrodes has also contributed to decreased furnace dwell time. In a specific example which will be described in greater detail hereafter, the furnace dwell time from the beginning of charging to the end of tapping will be decreased from four to four and one half hours to two hours or less.

BRIEF SUMMARY OF THE INVENTION

In this invention, the increased throughput will be achieved by reducing heat sink in the molten steel contacting components of the system, the use of carryover heat from melt to melt and the prompt placement of a stripped ingot, while it is still hot, into a heating furnace to heat the initially partially heated ingot to deformation temperature for the subsequent forging operation.

The decrease of heat loss due to heat sink will be achieved by preheating a selected component or components of the metal contacting units. For example, by preheating the tapping ladle until the refractory lining will be in the vicinity of about 2000° F., and then slowing the cooling rate of the tapping ladle by use of a refractory cover which is applied to the upper open end of the ladle until moments before tapping, the tapped metal will be minimally cooled during the tapping step.

Heat input to the system will be further decreased by carryover of a minor, but effective, quantity of molten steel from one tap to the next. Thus, for example, assuming start up from an empty arc furnace, and with an aim of teeming 75 tons of molten metal, approximately 80-85 tons of solid scrap will be charged into the arc furnace. After melting, a melt consisting of seventy-five tons of molten metal will be tapped into a tapping ladle.

Upon completion of tap, and return of the arc furnace to an upright position, the furnace cover will be moved away from the furnace bowl and an amount of approximately seventy-five tons of solid scrap will be charged into the approximately ten tons of molten steel carried over from the immediately preceding melt. The carryover melt plus the turnings from the scrap charge bucket in the succeeding heat will form a reservoir of hot metal which will engulf and thereby melt the scrap hot tops and other large pieces in the arc furnace charge at a much faster rate than if the furnace bowl was totally empty before the first scrap charge bucket was emptied into the arc furnace; the carryover metal will surround and transfer conductive heat to the large pieces of scrap much sooner than would occur if the bushelings and other small pieces of scrap had to change from solid to liquid state before conduction heating of the large pieces could begin.

The invention ensures that at least four different steel making processes may be practiced in any day and in any sequence, the specific process performed depending only on the sequence in which the different types of steel are ordered to be made. This hitherto unattainable flexibility in end use will be attainable in a single plant which will be adaptable to carry out steel making processes which are currently recognized as separate and distinct but which are seldom, if ever, found in existing plants.

Thus, for example, the steel maker may have a sufficient number of orders for low alloy steel that one or more successive heats of steel need only be subjected to the basic processing steps of melting, refining in the ladle metallurgical furnace, degassing at the vacuum degassing station, teeming and solidification.

However if the steel maker's next customer desires a vacuum arc remelt (VAR) product, the steel maker, after melting, ladle metallurgical refining, vacuum degassing and teeming a succeeding melt to form an ingot, may divert the solidified vacuum degassed ingot to a vacuum arc remelt unit in which the solidified vacuum degassed ingot will be converted into a VAR electrode, the VAR electrode remelted in the VAR unit to form a VAR ingot, and the resultant VAR ingot thereafter processed as required, such as forging and heat treatment.

And should a third customer order a vacuum degassed and vacuum oxygen decarburized steel, that third customer's order may be started without delay in the arc furnace without alteration of the first two stages—the melting and ladle metallurgical refining stages—and then subjected to vacuum oxygen decarburization in the vacuum degassing unit, to be followed by teeming and solidification.

And, further should the steel maker's fourth customer order specify a vacuum oxygen decarburized vacuum arc remelted steel, the processing of such a special steel may be incorporated into the production sequence without delay and without alteration of either of the first two processing stages—arc furnace melting and ladle metallurgical furnace refining—which steps require the longest blocks of time as will be seen hereafter.

It is accordingly an object of the invention to provide, in a system having a single arc furnace, a single ladle metallurgical furnace and a single vacuum treatment station, the ability to carry out at least four dissimilar steel making processes in randomized order, namely high volumes of standard grades of vacuum degassed steel, vacuum arc remelted steel, vacuum oxygen decarburized extra low carbon steel, and vacuum oxygen decarburized vacuum arc remelted extra low carbon steel.

Another object of the invention is to carry out the above described steel making processes in which the vacuum treatment common to all four processes cannot be compromised by unintended degradation of the vacuum integrity of the system attributable to utilizing the metal containing vessel as a component of the vacuum system.

A further object of the invention is to decrease the heat energy required per unit, such as a ton, of steel produced as contrasted to conventional ladle metallurgical furnace refining systems.

BRIEF DESCRIPTION OF THE SEVERAL VIEWS OF THE DRAWING

The invention is illustrated more or less diagrammatically in the accompanying drawing in which FIG. 1, consisting of sub-parts 1A, 1B and 1C, is a plan view of a system, with certain parts indicated schematically or by legend, for carrying out the processes of the invention.

Like parts will be used to refer to like or similar parts from Figure to Figure of the drawing.

DETAILED DESCRIPTION OF THE INVENTION

Figure 1A:
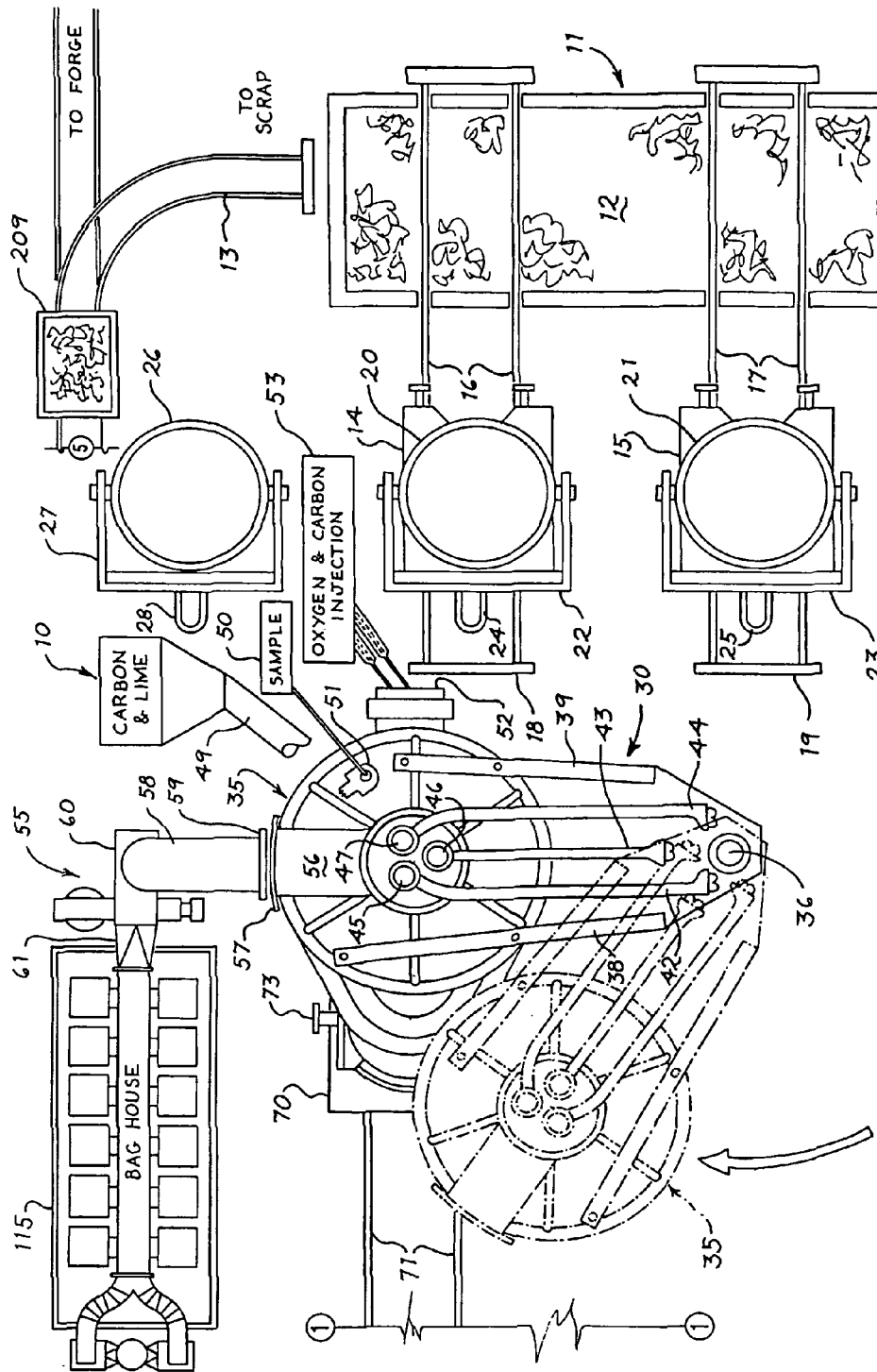

The system of this invention, which system enables at least four separate and distinct inventive steel processes to be carried out, is indicated generally at 10 in FIGS. 1 and 2. The invention can be best understood by reading each of FIGS. 1 and 2 from right to left commencing with FIG. 1.

A scrap house is indicated generally at 11 and scrap suitable for making any desired type of steel from extra low carbon stainless to low alloy is indicated at 12. Scrap stocking means, here a rail system, is indicated at 13. The rail system will be constructed so as to be able to transfer system scrap, such as hot tops and pyramid ingots, from downstream collection points in the system and, also, fresh scrap received from outside the system. Scrap may arrive by non-rail transport such as truck. Scrap charging cars are indicated at 14, 15, each scrap car traveling on an associated set of rails 16, 17 each of which extends from the scrap house to a terminus 18, 19 adjacent an arc furnace indicated generally at 30. Scrap cars 14, 15 carry charging buckets 20, 21 respectively which receive scrap from the scrap house by any suitable means, such as a mechanized crane, not shown for purposes of clarity. Each of scrap buckets 20, 21 includes a bail 22, 23 respectively mounted on trunnions located on each side of the scrap buckets, and U-shaped lifting brackets 24, 25 respectively.

A spare charging bracket is indicated at 26 having a bail 27 and lifting bracket 28.

The arc furnace includes a bowl indicated generally at 31, best seen in FIG. 2. The furnace is rockable in a vertical plane, best seen in FIG. 5, by means of a toothed rack 32 and pinion 33 system, see FIGS. 2 and 5, mounted on a rocker pedestal 34. A cover is indicated generally at 35. In FIG. 1A the cover is shown in its closed, operative position by solid lines and in its open, charging position by phantom lines. The cover swings from the charging to open position about pivot 36. Cover 35 is rigidly carried by left and right cover suspension arms 38, 39 extending from a base structure which swings about pivot 36. Three electrode feeds are indicated at 42, 43 and 44 which terminate at graphite electrodes 45, 46 and 47 respectively. For a system capable of melting about 75-115 tons the electrodes are preferably 16" in diameter and capable of generating about 75 MVA during a melting sequence.

Figure 2A:
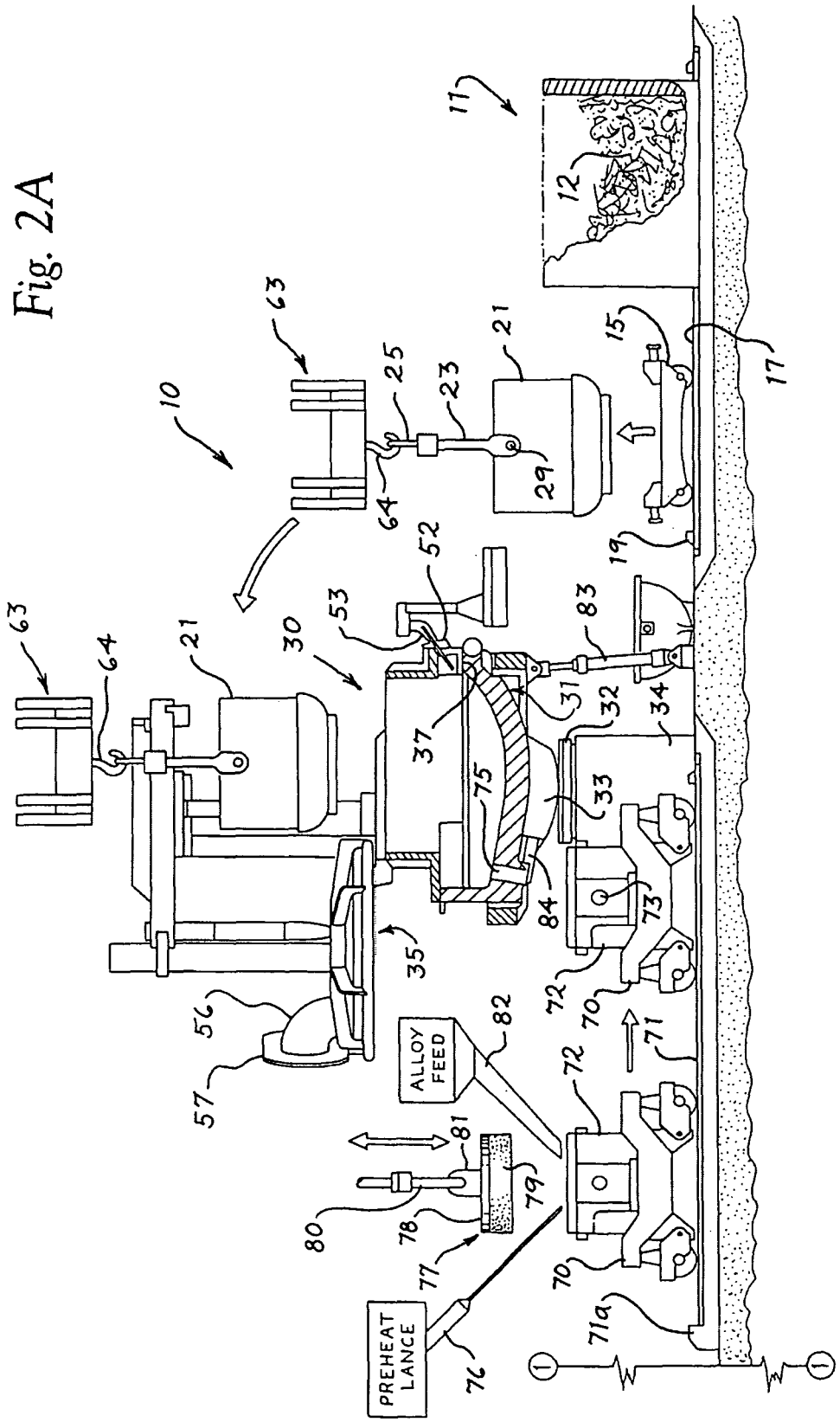
FIG. 2, consisting of sub-parts 2A, 2B and 2C, is a side view of the system of FIG. 1, with certain parts indicated schematically or by legend, for carrying out the processes of the invention.

A chute system for adding charge materials such as carbon and lime to the furnace is indicated at 49. A sampling device is indicated at 50, the sampling device accessing the heat in the furnace through flapper 51. A slag off door is indicated at 52. An oxygen and carbon injection lance system is indicated at 53. When the arc furnace cover 35 is in operating position on top of the arc furnace bowl, the bottom surface of the rim 37 of the cover 35 makes contact about its entire periphery with the top surface of the rim of the bowl 31 as best seen in FIG. 2A. Although the fit is close, it is not vacuum tight.

Figure 3:
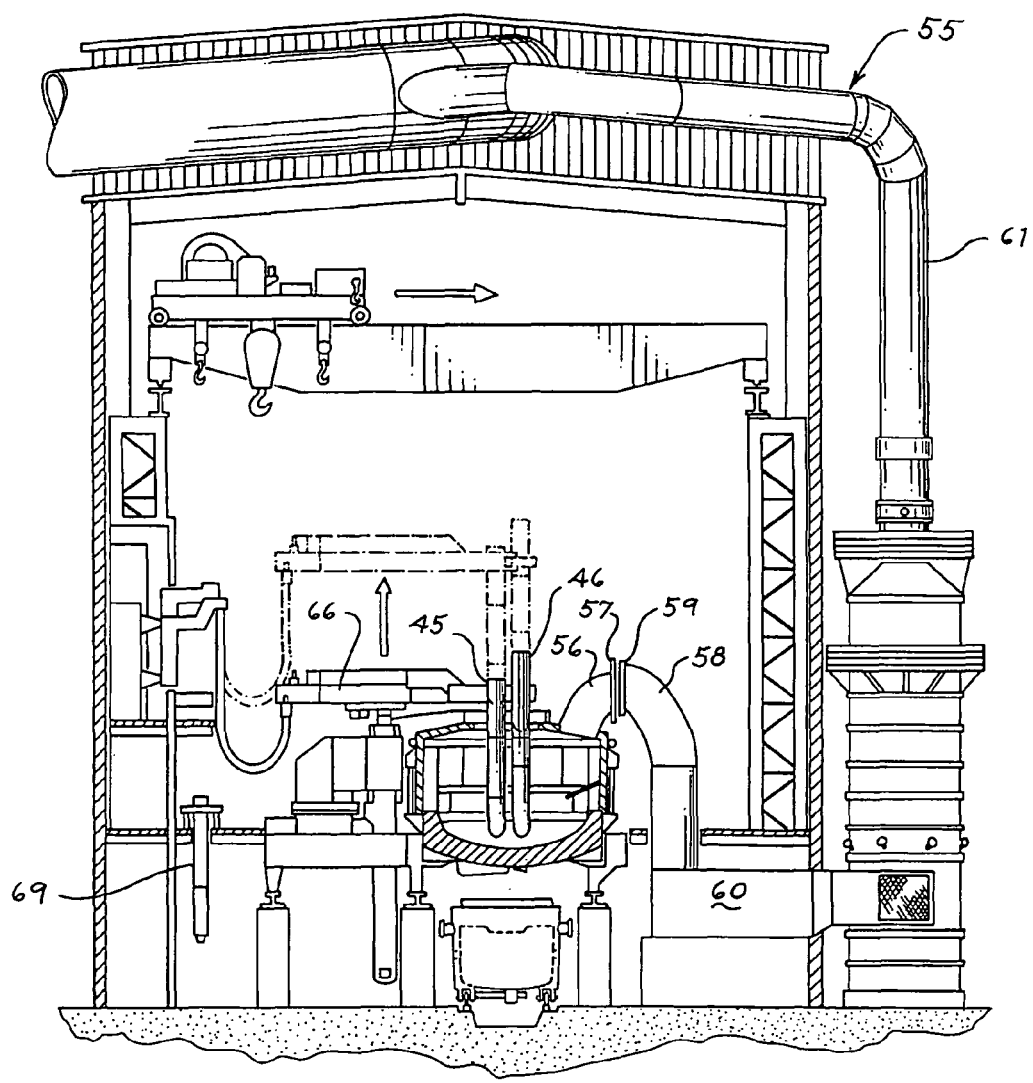
FIG. 3 is an elevation with parts in section, and others in phantom, of the arc furnace and the system ducting.

The arc furnace ducting system is indicated generally at 55 in FIGS. 1A and 3. The ducting system includes an offtake elbow 56 which connects, at its inner end, with an opening in the cover 35, and terminates, at its discharge end, in a circular flange 57. The stationary portion of the ducting system includes an intake elbow 58 terminating in a circular flange 59. When the cover is closed, circular flange 57 of the cover offtake elbow 56 is in closely spaced relationship with flange 59 of intake elbow 58 of the ducting system. From FIGS. 1A and 3 it will be noted that the clearance between the flanges 57 and 59 is very small with the result that very little, if any, of the fumes generated during furnace operation will escape from the slight space between the flanges. Ducts 60 and 61 convey the fumes collected from the furnace to the bag house 115 indicated in FIG. 1A.

From FIG. 2A it will be seen that, with the cover 35 swung to the open position of FIG. 2A (and the phantom position of FIG. 1A), a scrap crane indicated generally at 63 having a hook 64 will lift first charging bucket 21 off scrap car 15 and position the bucket over the open furnace bowl 31 from whence the scrap in the bucket is loaded into the bowl 31 of furnace 30.

Figure 4:
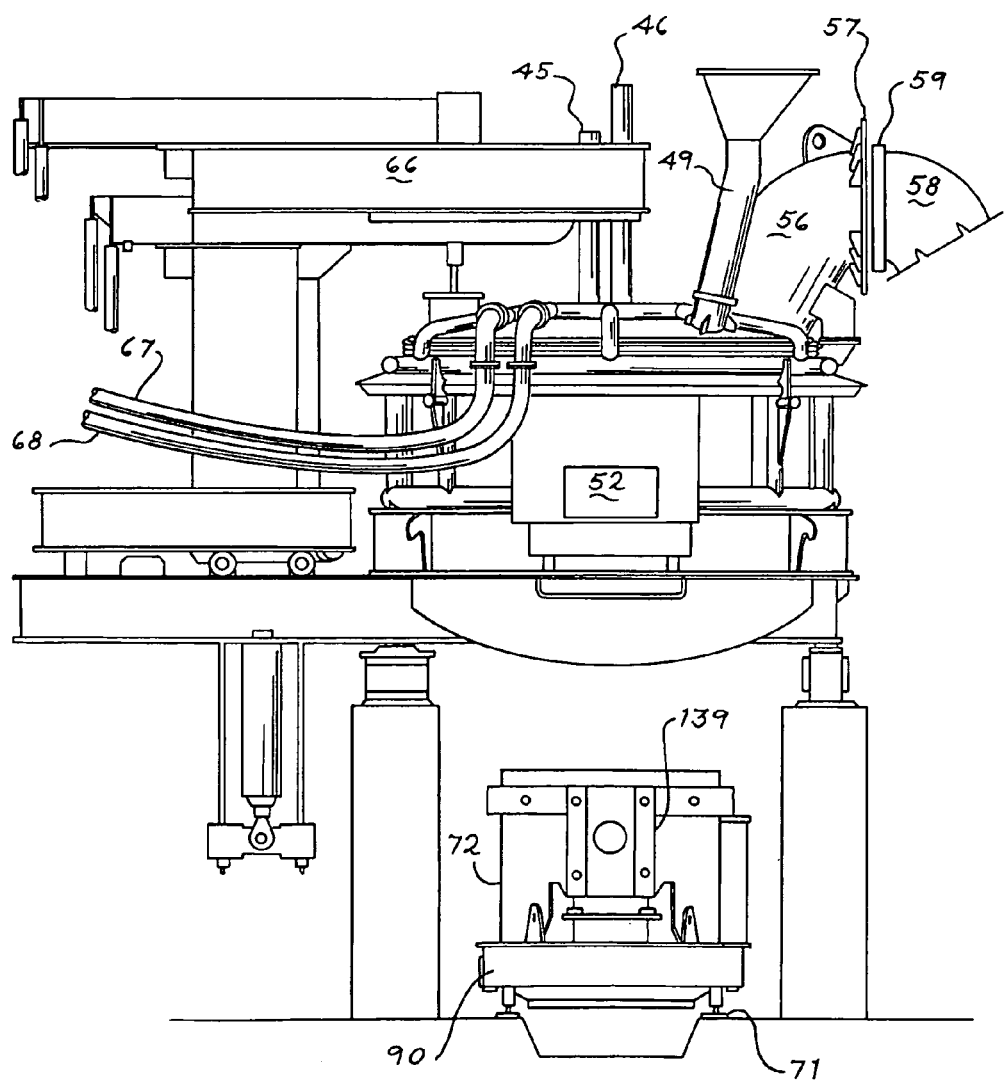
FIG. 4 is a view similar to FIG. 3 but to a larger scale and illustrating particularly the ducting connection between the furnace and the stationary ducting system.

The three electrodes 45, 46 and 47 are moveable by a gantry type lifting assembly 66, see FIG. 3, from the operating positions shown in solid lines in FIGS. 3 and 4 to the retracted position of FIG. 3, shown in phantom, so that the cover 35 can be swung to the charging position of FIG. 2A. The cover is water cooled by inlet and outlet piping 67 and 68, see FIG. 4. Each of electrodes 45, 46 and 47 are composed of separate sections which are screwed together as seen in FIG. 3. A spare electrode section is indicated at 69 in FIG. 3.

Figure 2B:
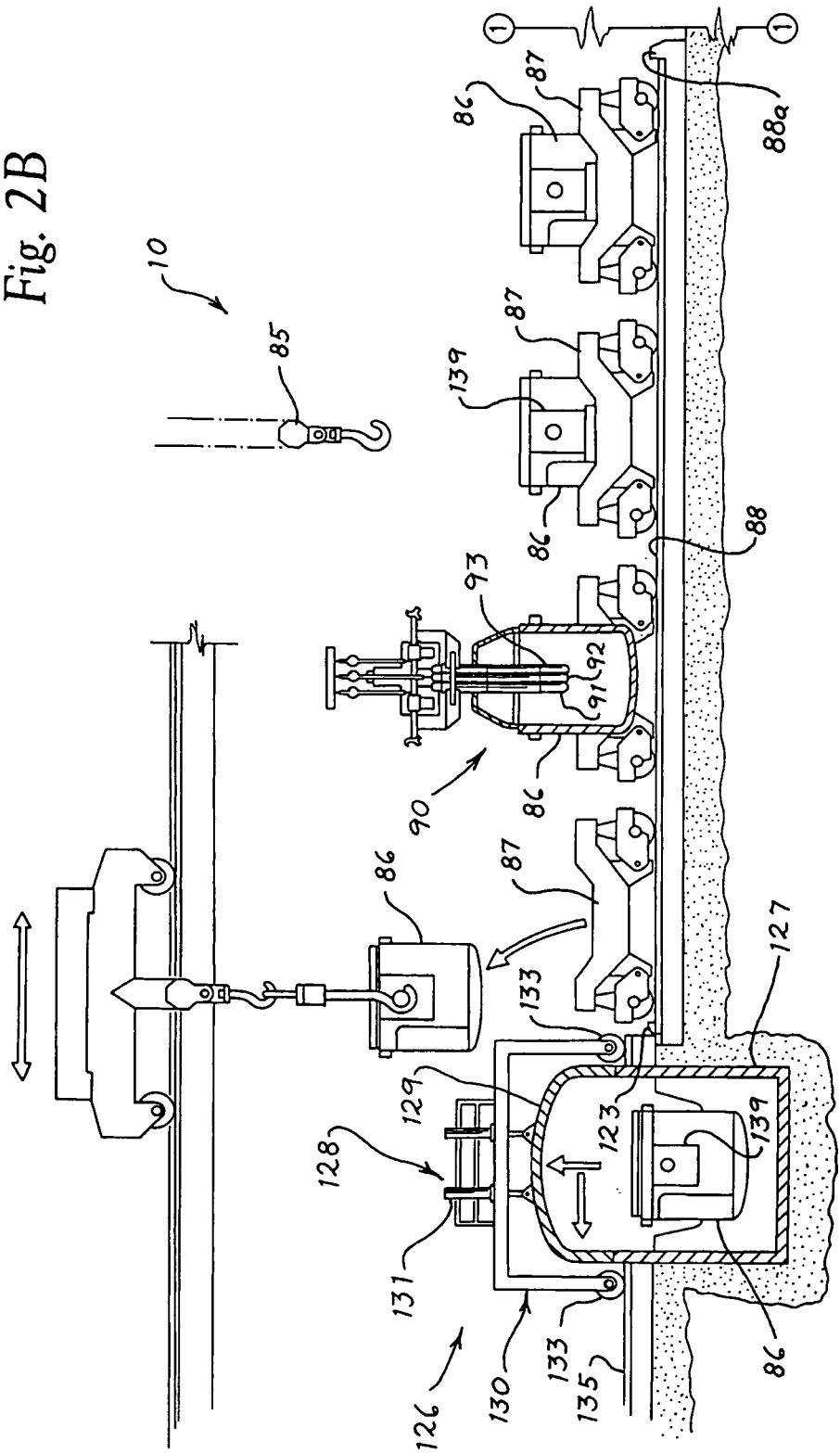

A tapping ladle car is indicated at 70 which runs on track 71 which track extends, in this instance, from just beneath the arc furnace 30 at its upstream end to a position 71a just short of the next treatment station shown in FIG. 2B. A tapping vessel, here a tapping ladle is indicated at 72 in FIG. 2A on the tapping car 70, the tapping ladle having trunnions 73, 74 by which the ladle may be transported by crane. In FIGS. 1A and 2A the tapping car 70 and ladle 72 are positioned just beneath the tap hole 75 of arc furnace 30.

Although only one tapping car 70 and tapping ladle 72 are used, a second tapping car and ladle has been shown in FIG. 2A to represent the location of the car and ladle during an important preceding operation to be described hereafter.

While a melt is being made in the arc furnace 30, a tapping ladle 72 will undergo preheating to at least about 2000° F. by a preheat lance 76. Immediately upon preheating the tapping ladle to a desired temperature, the preheat lance is turned off and removed, and a shield, indicated generally at 77 in FIG. 2A is placed directly on the rim of the ladle. The shield 77 is composed of a backing plate 78 and an insulation layer 79 formed from a high temperature resistant fibrous refractory. The shield is raised and lowered as indicated by the vertical arrow by crane hook 80 which hooks into lifting bracket 81 of the shield. As soon as the melt in the furnace 30 is ready for tap, the shield 77 is raised. At this time, and if required by the heat instructions, charge materials, such as alloys, may be added to the tapping ladle 72 from alloy feed assembly 82. The tapping car 70 and preheated tapping ladle 72 are then positioned beneath the arc furnace tap hole 75 as seen in FIG. 2A.

Figures 5A, 5B, 5C:
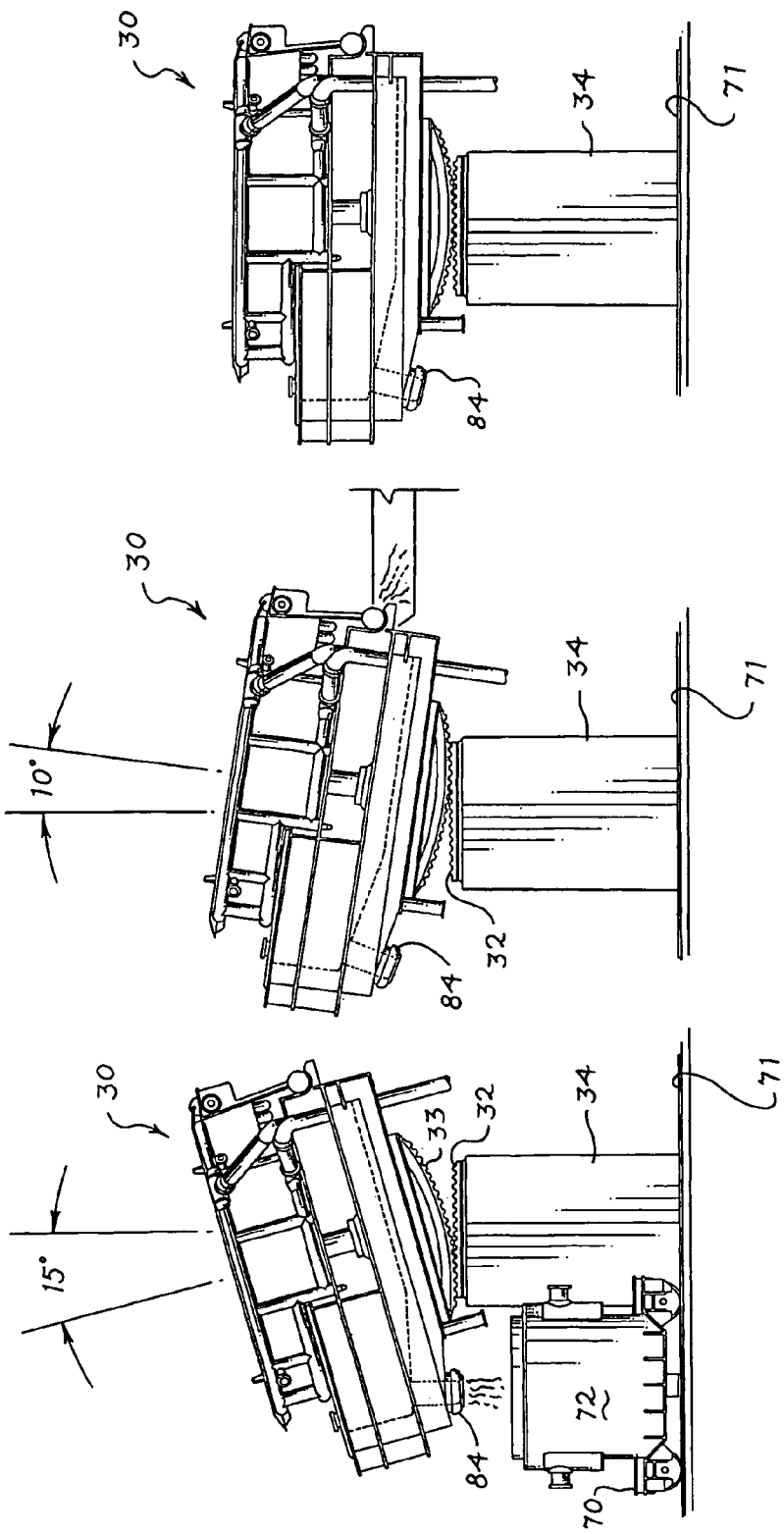
FIG. 5, consisting of positions 5A, 5B and 5C, is a schematic illustration of the operating, tapping and slag off positions of the bowl of the electric arc furnace.

A slide gate for the arc furnace is indicated at 84. In FIG. 5, FIG. 5C represents the arc furnace in melting or empty condition, FIG. 5B represents the furnace in slag off position and FIG. 5A represents the furnace in tapping position.

Referring now to FIG. 2B, the tapping ladle car 70 together with its now filled ladle 86, containing anywhere between 75 and 115 tons of tapped metal, is shown near the downstream terminus 71a of its track 71. At this point the filled ladle 86 is lifted by crane 85 from its position at the terminus of track 71 to a ladle metallurgical furnace (LMF) car 87 located at the upstream terminus 88a of its associated LMF track 88. Tapping car 70 now returns to its preheat position shown in FIG. 2A to receive the next tapping ladle and then await the next melt to be tapped from the arc furnace 30.

Figure 8:
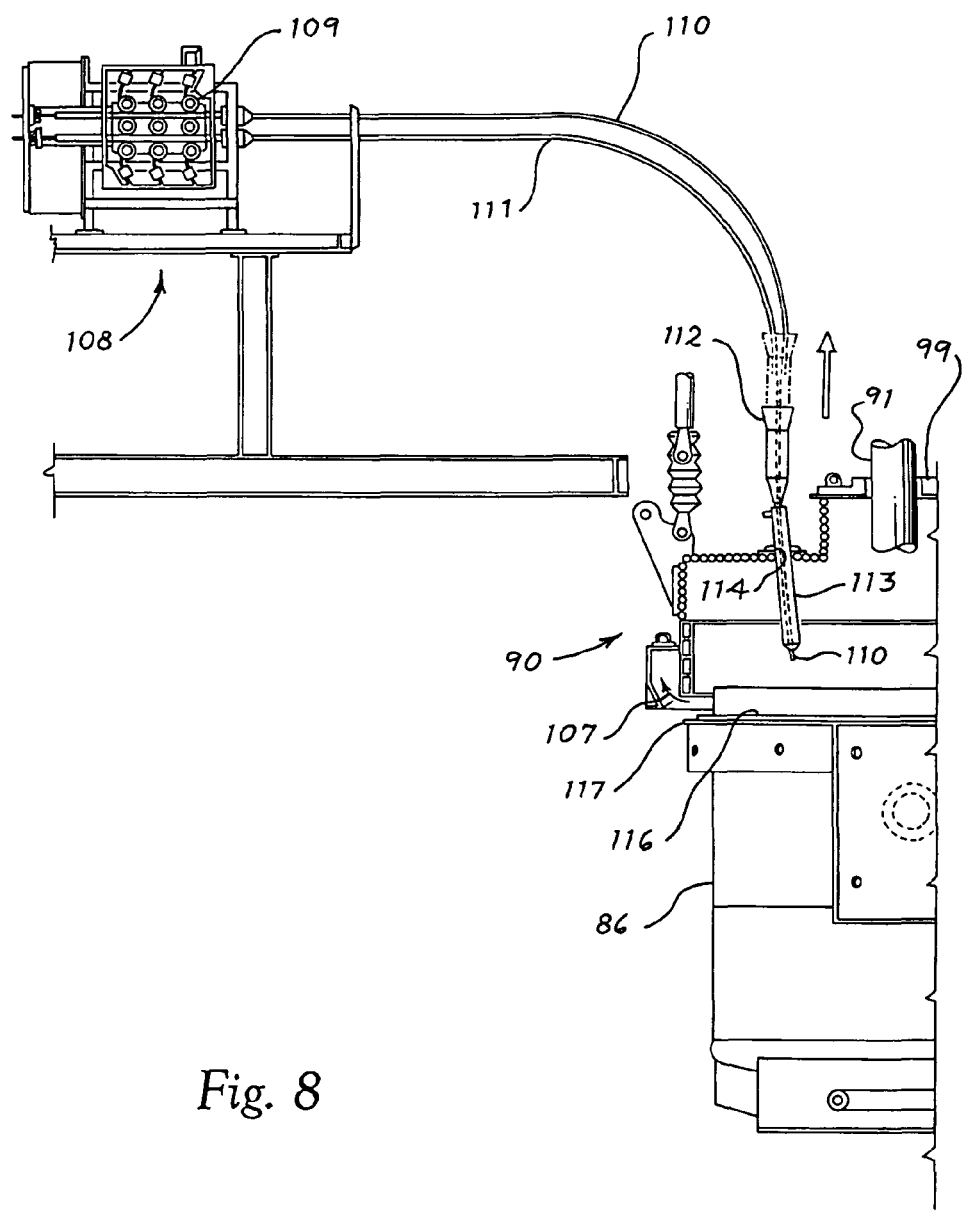
FIG. 8 is a view of the alloy wire feed feature of the ladle metallurgical furnace.
Figure 9:
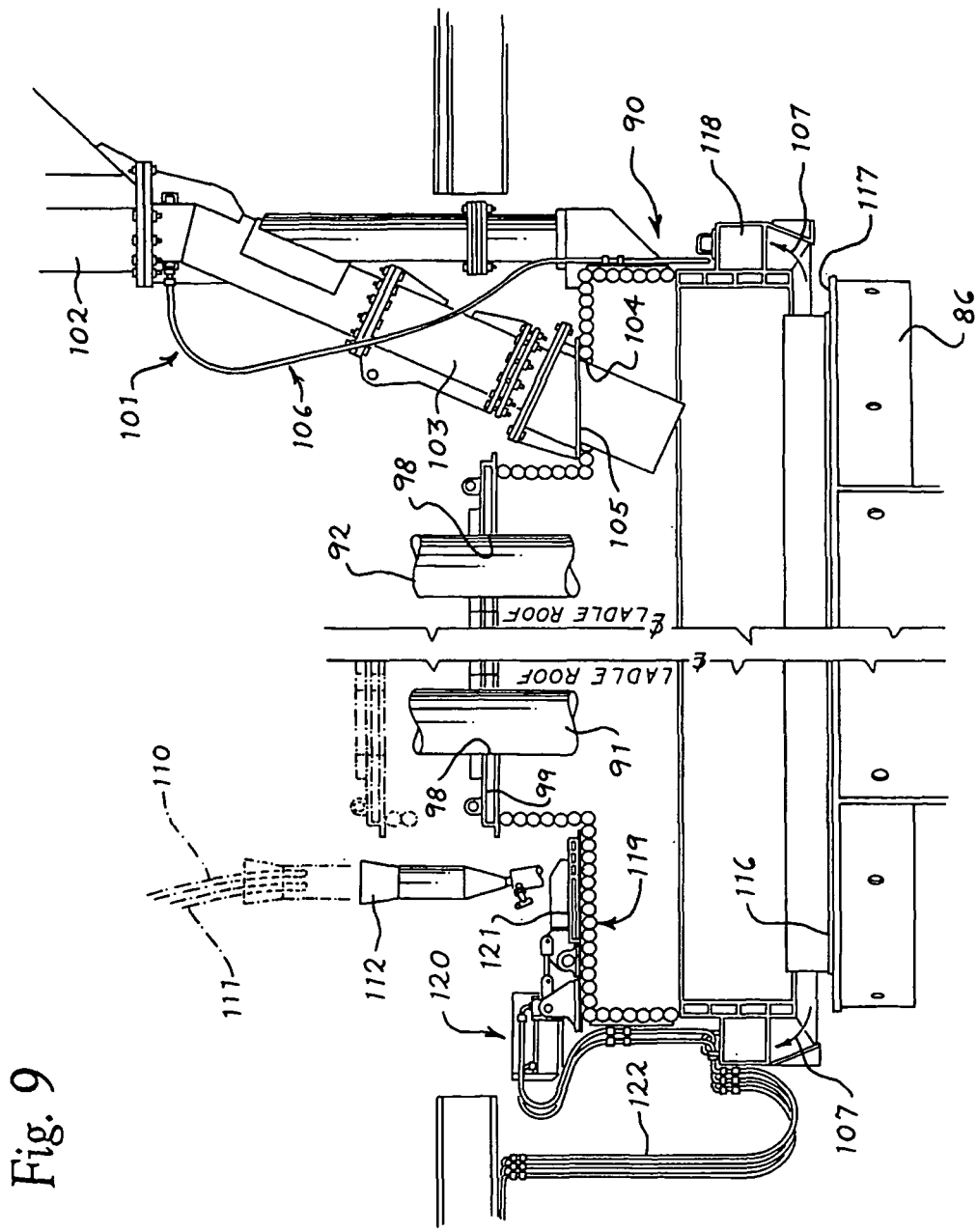
FIG. 9 is a section through the roof of the ladle metallurgical furnace with one half of the roof rotated 60° illustrating particularly the alloy and other charge material addition system of the LMF.

The LMF station includes a roof, indicated generally at 90, through which three electrodes 91, 92 and 93 project downwardly in its center region. The electrodes receive power from a power source 94 and power leads 95, 96 and 97 shown in FIG. 1B. The electrodes are snugly received in opening 98 in the center plate 99 as best seen in FIGS. 8 and 9. A flapper 100 shown best in FIG. 1B in roof 90 will permit temperature sampling by the system of FIG. 7 and chemical sampling by the system of FIG. 6. Bulk alloys are added as required through alloy chute system indicated generally at 101 in FIG. 1B, and in greater detail in FIG. 9. The bulk alloy chute system 101 includes a feed conduit 102 which is connected to a number of hoppers, not shown, each hopper containing a desired alloy material. An inclined chute 103 passes into the chamber beneath the LMF roof through opening 104, which opening can be sealed by a plate 105 when required. An electronic chute control system indicated generally at 106 in FIG. 9 will be operable to regulate the order and quantity of alloy and slag materials to be added to the heat at any desired time or times.

Figure 1B:
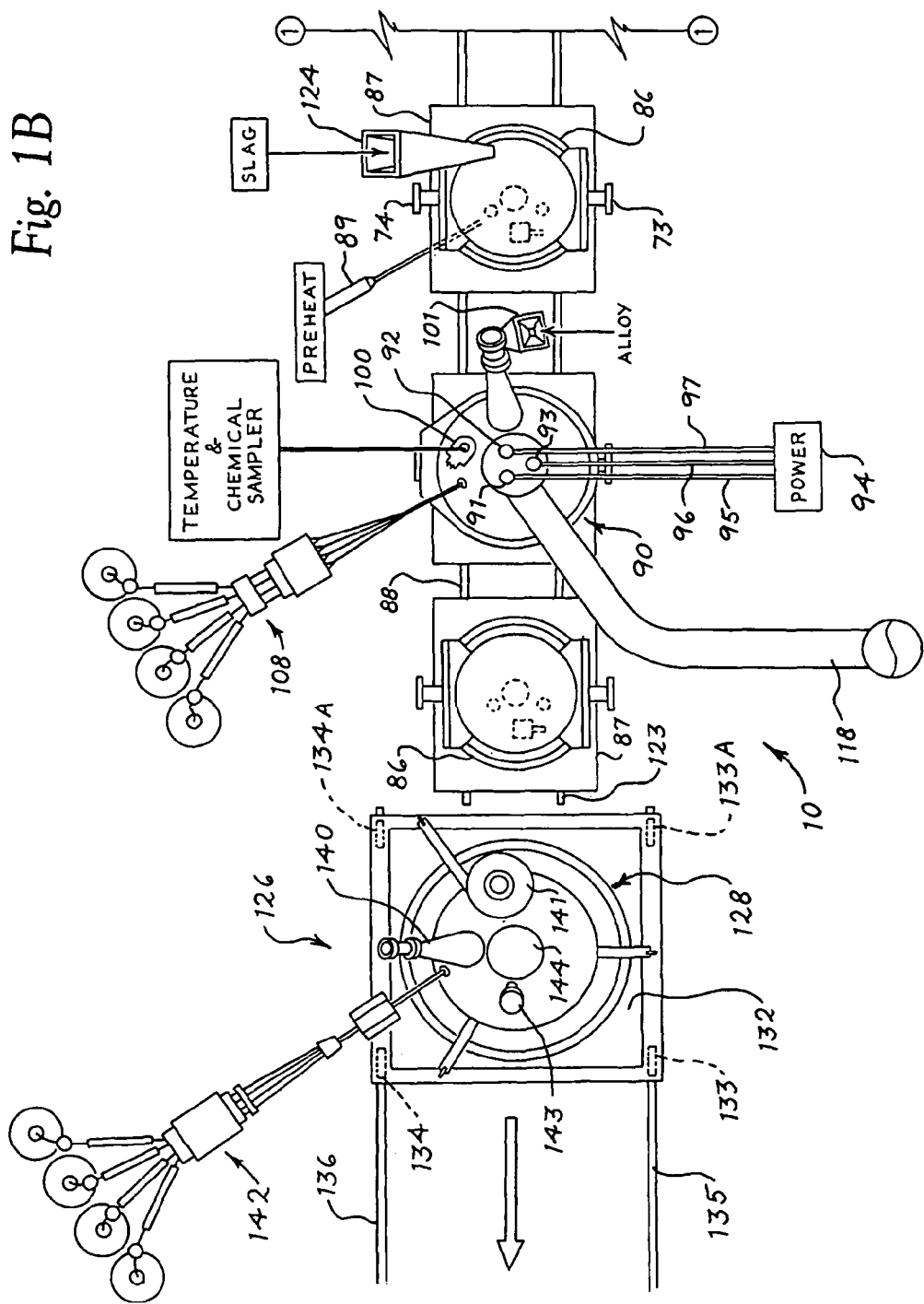

An alloy wire addition system is indicated generally at 108 in FIG. 1B and in greater detail in FIGS. 8 and 9. The system includes drive rollers 109 which, working through appropriate controls, will drive alloy feed wires 110, 111 downwardly toward a funnel 112, FIG. 8, from whence the particular alloy wire desired to be added to the heat enters feed tube 113. Feed tube 113 enters the chamber inside the LMF cover through opening 114 in the cover. In FIG. 8 only wire 110 is being added to the heat in ladle 86.

Figure 6:
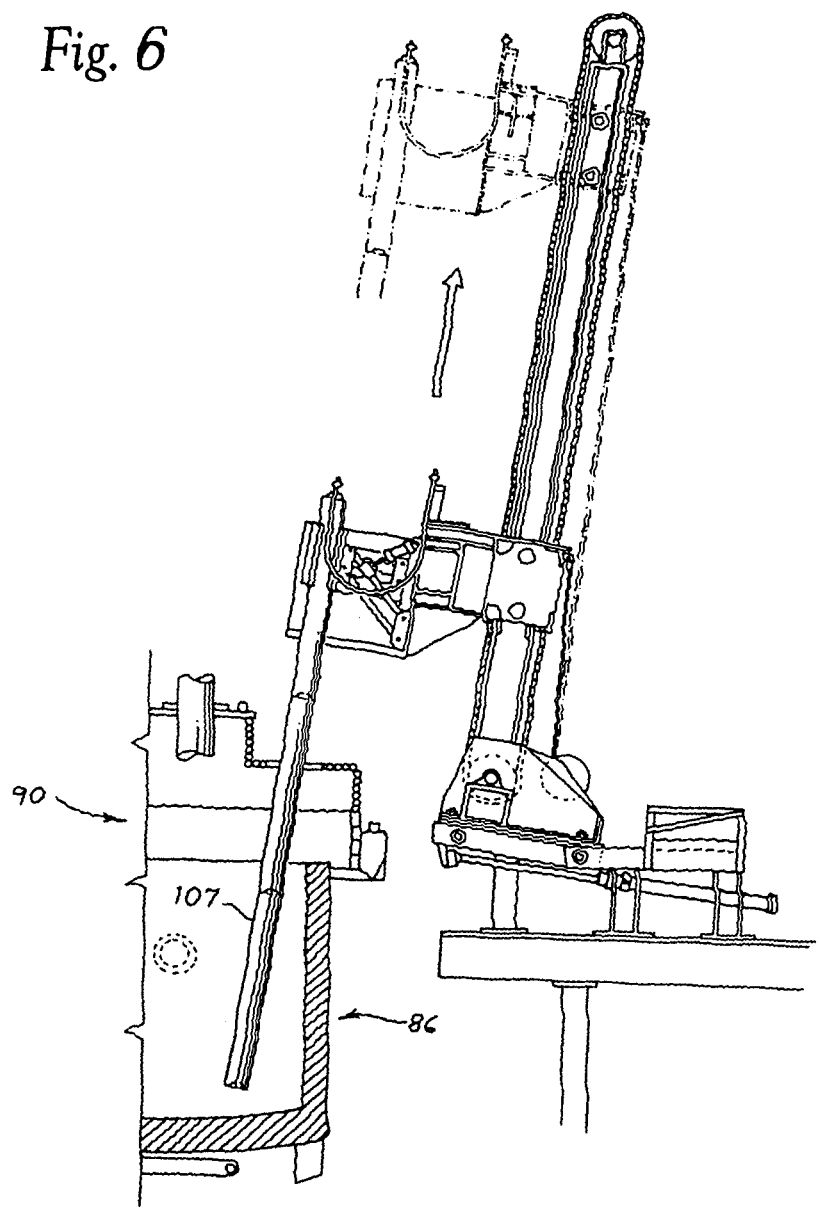
FIG. 6 is a partly schematic half section of the ladle metallurgical furnace portion of the system illustrating particularly the use of a sub-surface oxygen lance.

From FIGS. 8 and 9, and also in FIG. 6, it will be noted that the LMF roof 90 includes a bottom flange 116 which rests upon top flange 117 of the ladle 86. Since metal to metal contact is made a vacuum tight seal does not occur. It will be understood that the operation of the arcs and the chemical reactions which take place during the formation of the heat during the arcing period of the LMF will generate a large volume of fumes. The fumes so generated will follow a path indicated by the arrows 107 in FIGS. 8 and 9 to a large offtake duct 118, FIG. 1B, and then to the duct system 55 and the bag house 115 shown in FIG. 1A. FIGS. 6, 7, 8 and 9 also show the water cooling system of the LMF roof indicated generally at 119 in FIG. 9. FIG. 9 also shows, in connection with wire feed system 108, a slide plate system 120 which includes flap plate 121 actuated by control system 122 for uncovering an opening in the LMF roof for a sufficient period of time to feed in the required pounds of wire alloy. Although any alloy in wire form may be added it will be understood that Al is most frequently added. The dwell time of the ladle 86 in the LMF will vary with the size of the heat and the required degree of superheat. For a heat size of approximately 75 tons the arcs may be turned off when the temperature of the heat is about 3000° F.

Following extinguishment of the arcs the LMF roof and electrodes 91, 92 and 93 are raised to a position in which they clear the upper rim 117 of the LMF ladle. The LMF car 87 is then moved to its downstream terminus 123 of the LMF track 88, shown best in FIGS. 1B and 2B, which is closely adjacent, upstream, to the vacuum treatment station indicated generally at 126.

Figure 10:
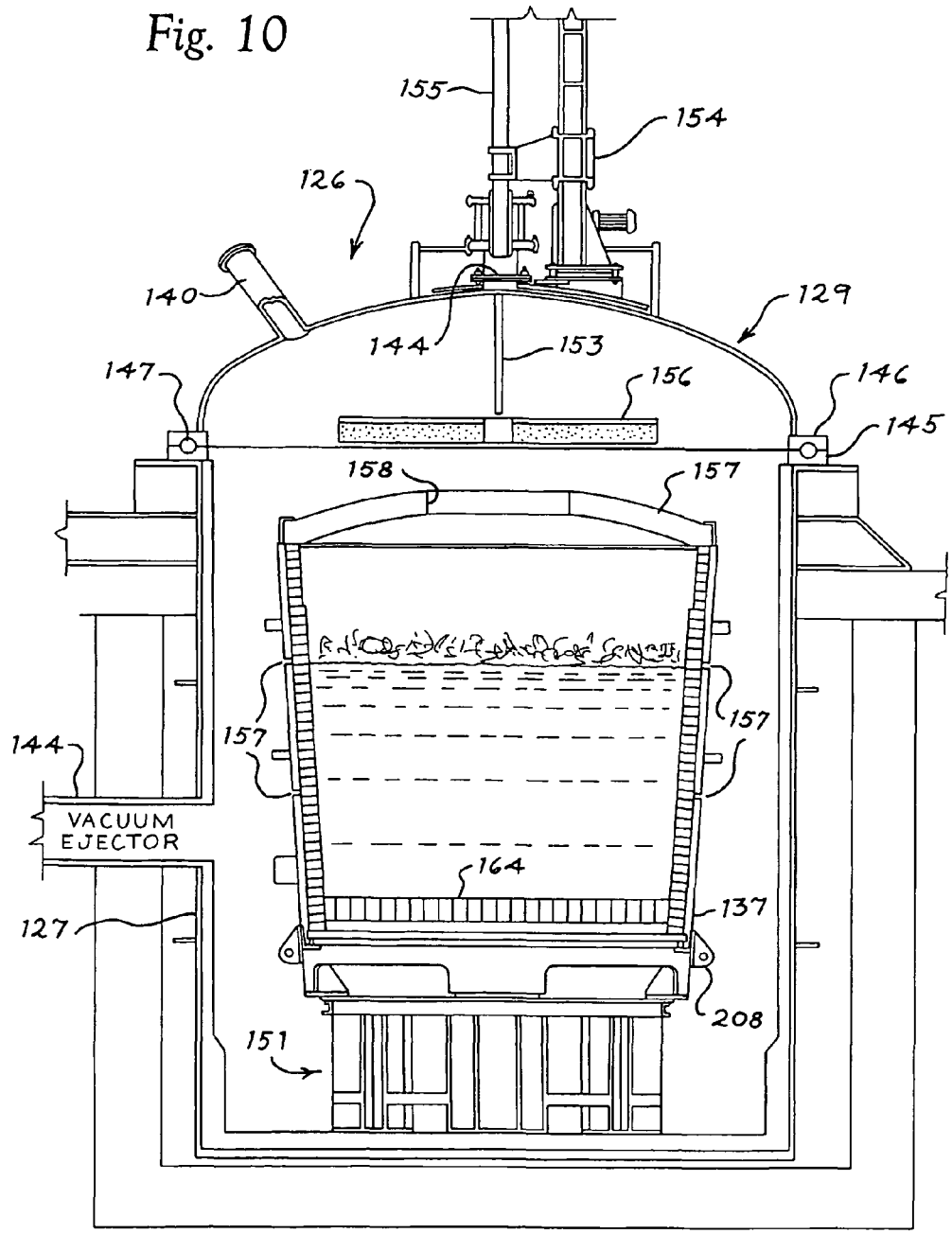
FIG. 10 is a vertical section through the combination vacuum degassing and vacuum oxygen decarburization treatment features of the vacuum treatment station showing the station in vacuum degassing mode.
Figure 12:
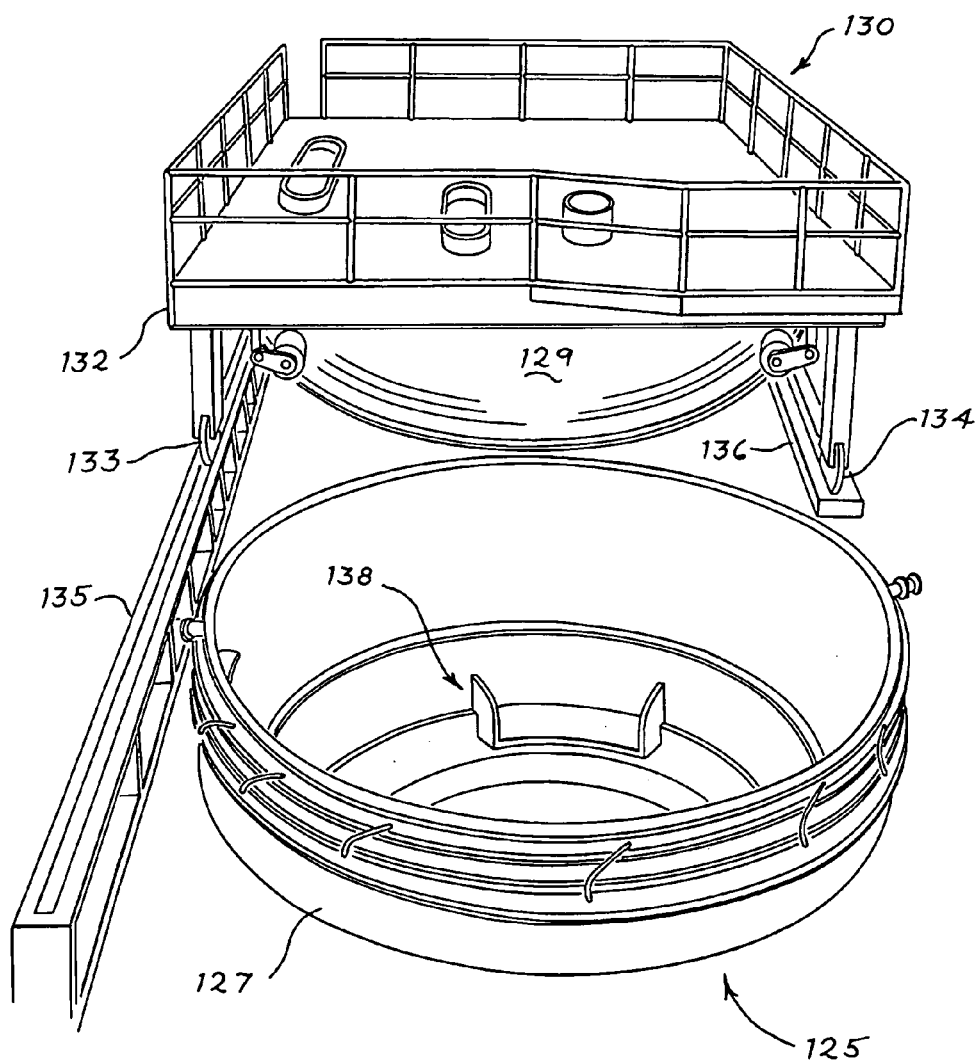
FIG. 12 is a perspective view of the vacuum treatment station with parts omitted for clarity and the cover elevated and rolled away preparatory to the reception of a ladle to be treated.

Vacuum treatment station 126 includes a stationary vacuum tight tank base 127, here shown as embedded in the ground in FIGS. 2B and 10, and a tank cover assembly indicated generally at 128. The tank cover assembly includes tank top 129 which is mounted to and carried by a wheeled gantry type superstructure 130. Lift jacks 131 raise and lower the tank top 129. The gantry type superstructure, shown best in FIG. 12, is comprised of a platform 132 mounted on wheels 133 and 134 which roll on tracks 135 and 136 respectively. In the illustrated embodiment the tracks 135 and 136 are at different elevations with respect to a reference base but it will be understood that, to accommodate space limitations, the tracks could be at a common height, as is implied from the schematic showing in FIG. 1B. In any event, the tank top must be lifted and moved a sufficient distance to provide unimpeded access to the tank bottom from above so that a ladle to be treated can be dropped therein by crane.

The vacuum tank base 127 includes a pair of ladle saddles, one of which is indicated generally at 138 in FIG. 12. Each ladle has a pair of projections indicated at 139, see FIGS. 2B and 4, which rest on mating saddles 138 when the ladle is lowered into the vacuum tank base 127.

Vacuum tank cover assembly 128 carries a sight port 140, a bulk alloy and charge material dispenser 141, a wire feed assembly indicated generally at 142, and a temperature and sampling port 143. Again, although the illustrated structure indicates the flexibility of adding up to four wire alloys, aluminum will be the most often added since it will have its maximum grain refinement effect at this time in the cycle. A central port, which is covered by a vacuum tight cover plate 144 during non-vacuum decarburization cycles, is illustrated best in FIG. 1B.

Figure 11:
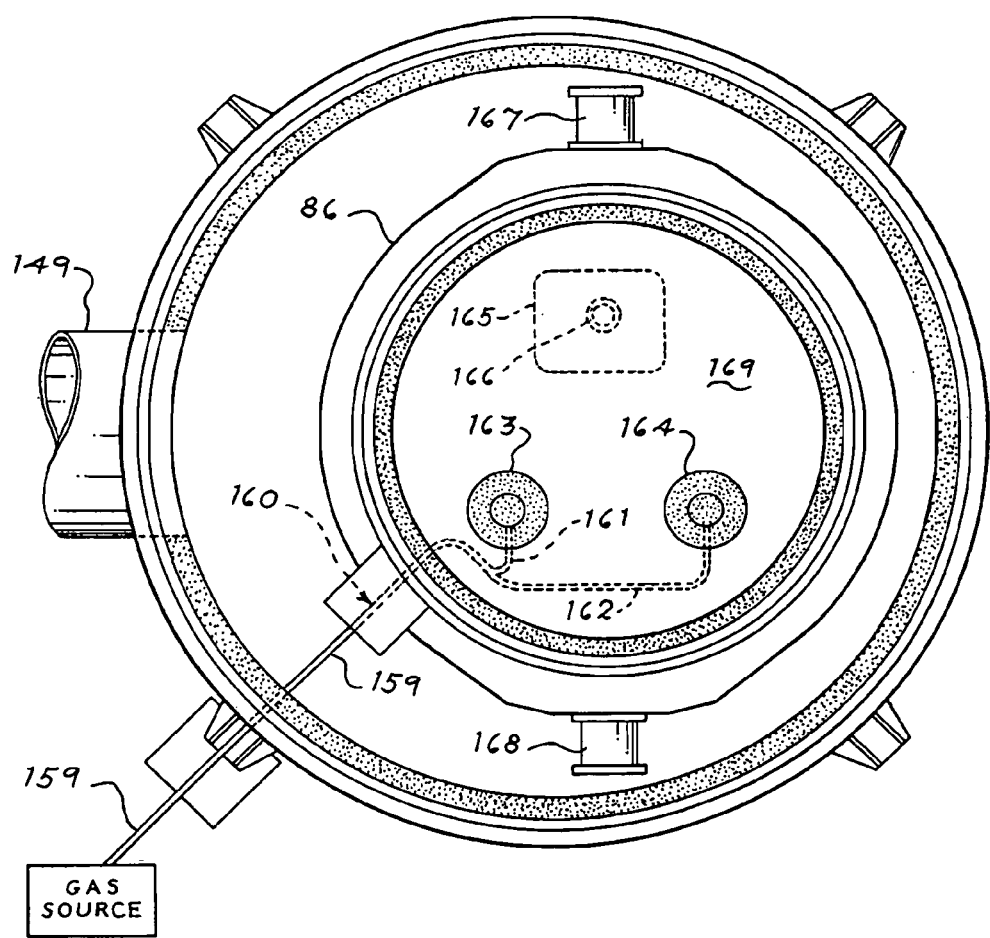
FIG. 11 is a top section through the tank of the combination vacuum degassing and vacuum oxygen decarburization station showing a ladle in position for vacuum treatment therein.

The vacuum system, which functions during straight vacuum degassing and vacuum oxygen decarburization cycles, and also the gas purging system, are illustrated best in FIGS. 10 and 11.

In FIG. 10 it will be seen that the lower rim of vacuum tank top 129 includes a tank top rim plate 146 whose flat undersurface is machined to form a close fit around its entire periphery with a mating surface on a rim plate 145 at the top of tank base 127, which top rim plate 145 has been similarly machined. A seal means, here represented by an O-ring seal 147, which functions in conjunction with the mating, close fitting rim plates, forms a vacuum chamber which is effective to create a vacuum pressure of one ton and less in continuous operation. This arrangement in this system wherein the entire ladle containing the molten metal is entirely within the vacuum environment has a distinct advance over systems in which the ladle itself forms part of the vacuum chamber. In such systems the possibility of leaks is constantly present due to the exposure of the upper rim of the ladle to degradation due to conditions in a melt shop, such as dribble of molten steel onto the upper exposed rim of the ladle, or the presence of hard particles, which are ever present in a melt shop environment, landing on the rim and thereby compromising the metal to metal seal. Further, in the instant system the outer metal wall of the ladle will have weep holes drilled therein so that gases contained in, primarily, the ladle refractory, may escape. In systems in which the ladle, before entering the vacuum tank, is exposed to ambient air for long periods of time (as contrasted to the short exposure to ambient atmosphere before teeming in the rapid cycle of the present invention) weep holes will permit the ladle refractory to becoming loaded with moisture containing air.

The ambient atmosphere in the present invention is removed through an offtake duct 149 which is part of a multistage steam jet ejector system, preferably a four or five stage system.

It will be noted from FIG. 10 that the filled ladle 86 rests upon an elevating base structure indicated generally at 151, here a plurality of beam cross sections. Should a breakout occur during operation, the elevating base structure ensures that the ladle base will not weld to the runaway metal so that the ladle can be lifted out of the tank to expedite clean up.

In vacuum oxygen decarburization cycles, including both vacuum arc remelt and non-vacuum arc remelt cycles, the vacuum treatment station is, in effect, modified to include oxygen lance blowing. Referring to FIG. 10, and during the oxygen addition portion of the operation, an oxygen lance 153, which is moved vertically up and down by guide structure 154, enters the tank chamber after the central port cover plate 144 is removed. The oxygen lance 153 passes through an auxiliary refractory heat shield 156 which is needed due to the extra heat generated by the carbon and oxygen reaction. The refractory cover plate 157, which has a central opening 158 to accommodate the lance 153, will have been placed on the top edge of the ladle after the ladle left the LMF station. The lance housing 155 and the lance 153 move through vacuum tight seals so that the steel may be simultaneously subjected to the vacuum and the oxygen blow. Should it not be possible, due to system parameters, to maintain a vacuum on the order of one torr or below during lance operation, the melt may be subjected to the vacuum in the absence of the lance for a short period after lancing, since the lancing operating will superheat the melt to a temperature above the desired teeming temperature.

The melt is subjected to the action of a purging gas during treatment, preferably at all times the tank is sealed, though the purging gas may be interrupted if, at any time, an operator observing the boil through the sight port 140 decides the boil is momentarily too heavy. The purging gas system is indicated best in FIG. 11. A stationary purging gas supply line 159 is connected upstream of the direction of gas flow with a suitable source of gas which is inert with respect to the metal undergoing treatment, such as argon. Stationary gas line 159 connects by a conventional slide coupling, not shown, to a feeder line carried by the ladle, indicated generally at 160, the connection of the feeder line 160 to the supply line 159 occurring as the ladle is lowered onto the ladle saddles 138 as a crane drops the ladle in place following the removal of the ladle from the LMF car and into the vacuum treatment station 126. Feeder line 160 branches to form a first plug feeder 161 and a second plug feeder 162 whose exit ends are embedded in refractory purging plugs 163 and 164, respectively, located in the refractory bottom 169 of the ladle. A slide gate on the bottom of the ladle 86 is indicated at 165 which opens and closes a ladle teeming nozzle 166.

Figure 1C:
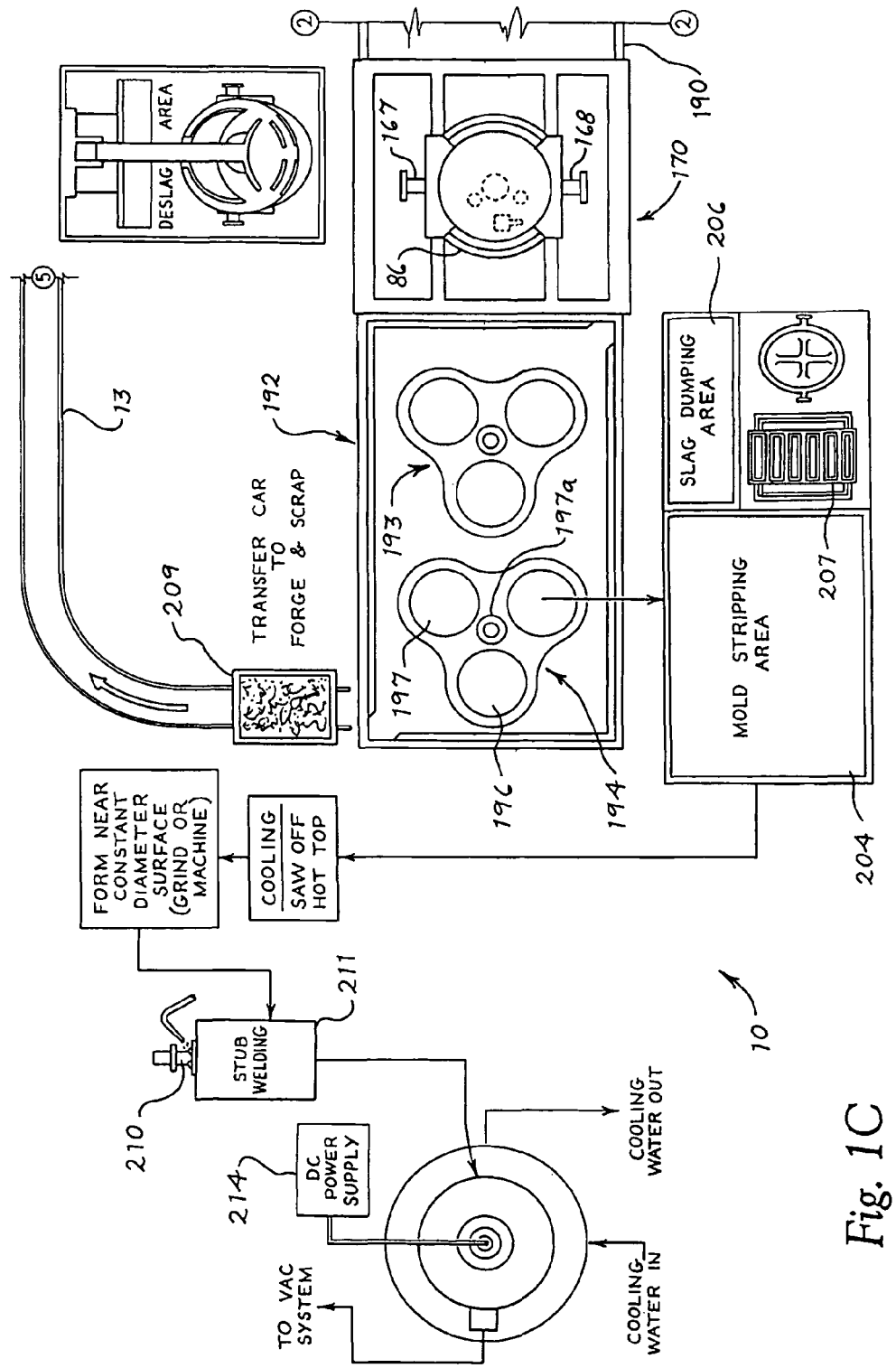
Figure 13:
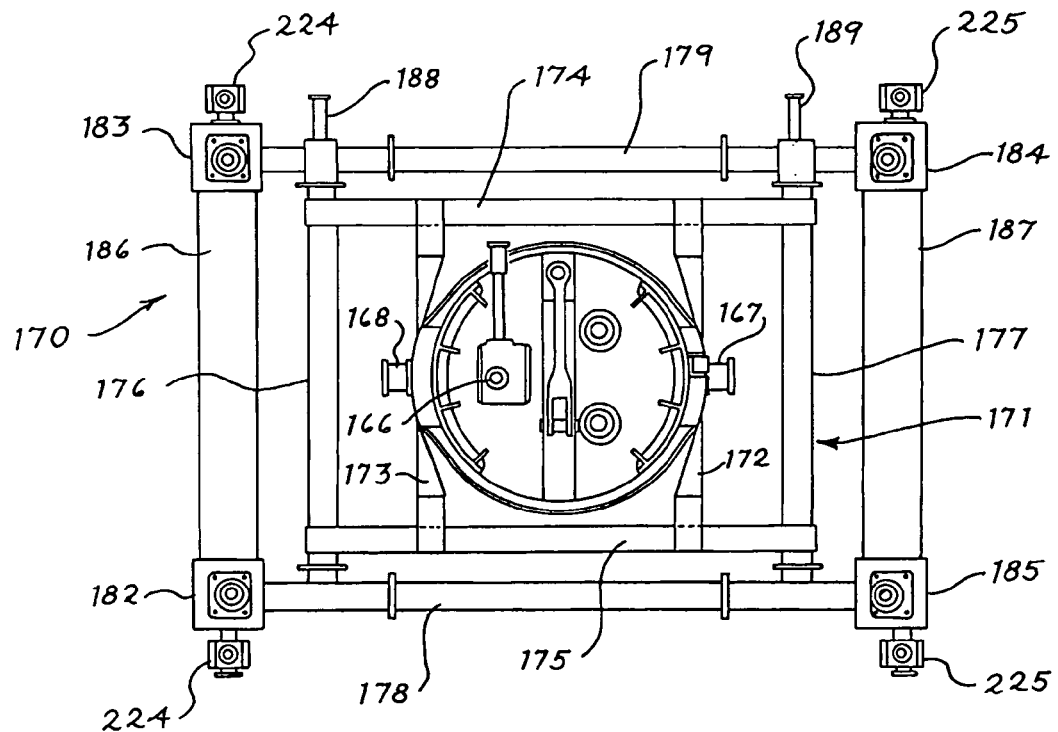
FIG. 13 is a top plan view of a ladle of steel in a teeming car.
Figure 14:
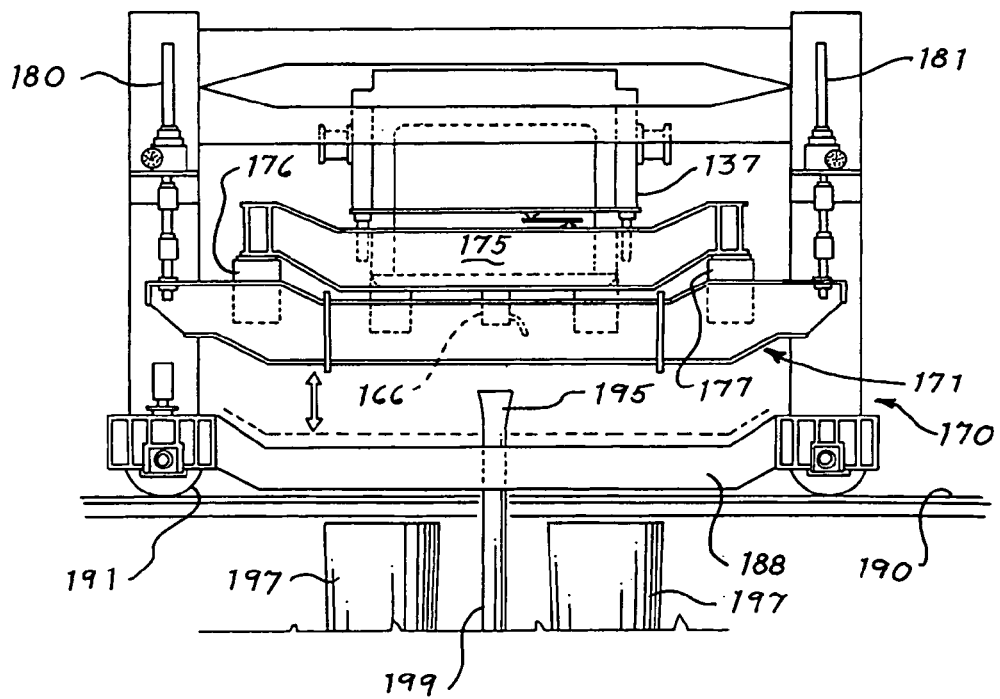
FIG. 14 is a side view of the ladle of FIG. 13 in an elevated position in the teeming car preparatory to teeming into a pouring trumpet.

Following vacuum treatment at the vacuum treatment station 126 as shown in FIG. 1B, and removal of the vacuum tank top 129, see FIG. 12, the ladle 86 is lifted by crane, which grips ladle 86 at its trunnions 167, 168, and lifts the ladle with its treated heat and places it on a teeming car indicated generally at 170, see FIGS. 1C, 13 and 14. Teeming car 170 includes a ladle positioning frame structure, indicated generally at 171, see FIGS. 13 and 14, which includes a pair of slightly V-shaped transverse cradle members 172, 173, which are fast at their ends with longitudinal cradle anchor members 174, 175. The longitudinal cradle anchor members 174, 175 are, in turn, fast with two main transverse struts 176, 177. The anchor members form a rigid sub-frame which is fast with a vertically moveable base frame having longitudinal sides 178, 179.

The base frame is raised and lowered by jack means, only two of which, 180, 181, are labeled. The jack means are secured to vertical posts 182, 183, 184 and 185. A rigid wheeled frame formed by longitudinal sides 188, only one of which is shown, and cross members 186, 187 receive the ladle in the position shown at the right side of FIG. 1C, the wheeled frame riding on track 190. The ladle 86 will have been crane lifted from the vacuum treatment station on to the wheeled frame of the teeming car 170. Lateral movement of the frame with respect to the track 190 is attained by operation of screw jacks, two of which are indicated at 224 and 225.

From the foregoing it will be seen that the teeming car, and a teem ready ladle 86 carried by it, can be moved in six directions to precisely align ladle teeming nozzle 166 with the flared end 195 of pouring trumpet 199. Thus the ladle teeming nozzle 166 on the bottom of the ladle can be positioned exactly above the upper flared end 195 of the pouring trumpet as seen in FIG. 2C by virtue of the six directions of movement of the teeming car carriage even when the upper flared end 195 of pouring trumpet 199 extends above the level of the track 190. As soon as the ladle is lifted from the LMF car, the LMF car returns to a location just downstream from the vacuum treatment station 126 preparatory to receiving the next vacuum treated ladle.

Teeming car 170 moves downstream to the teeming station, which includes a teeming pit area indicated generally in abbreviated form at 192 in FIGS. 1C and 2C. Teeming pit 192 will contain as many sizes of ingot molds as the steel making facility is designed to provide. In this instance a first cluster of three molds is indicated generally at 193 and a second cluster at 194.

First ingot bottom pouring means includes a primary receptacle or mold, here ingot mold 196, which rests on mold stool 197. Stool 197 in turn rests on runner base 198. The central bore of pouring trumpet 199 connects with an aligned vertical hole 197a in the mold stool 197, which hole connects to horizontal runner 202 in runner base 198 which in turn communicates with an ingot entry hole 200 in mold stool 197 to thereby enable the interior of ingot mold 196 to be filled from the bottom up. It will be understood that the pouring trumpet 199, the mold stool 197, and the runner base 198 are formed of strong pressure resistant ceramic material, and are discarded after each use. Ingot mold 196 may have flux material placed in its bottom prior to pouring for the purpose of lubricating the mold walls to facilitate mold stripping. A removable and reinstallable hot top is indicated at 201.

Figure 15:
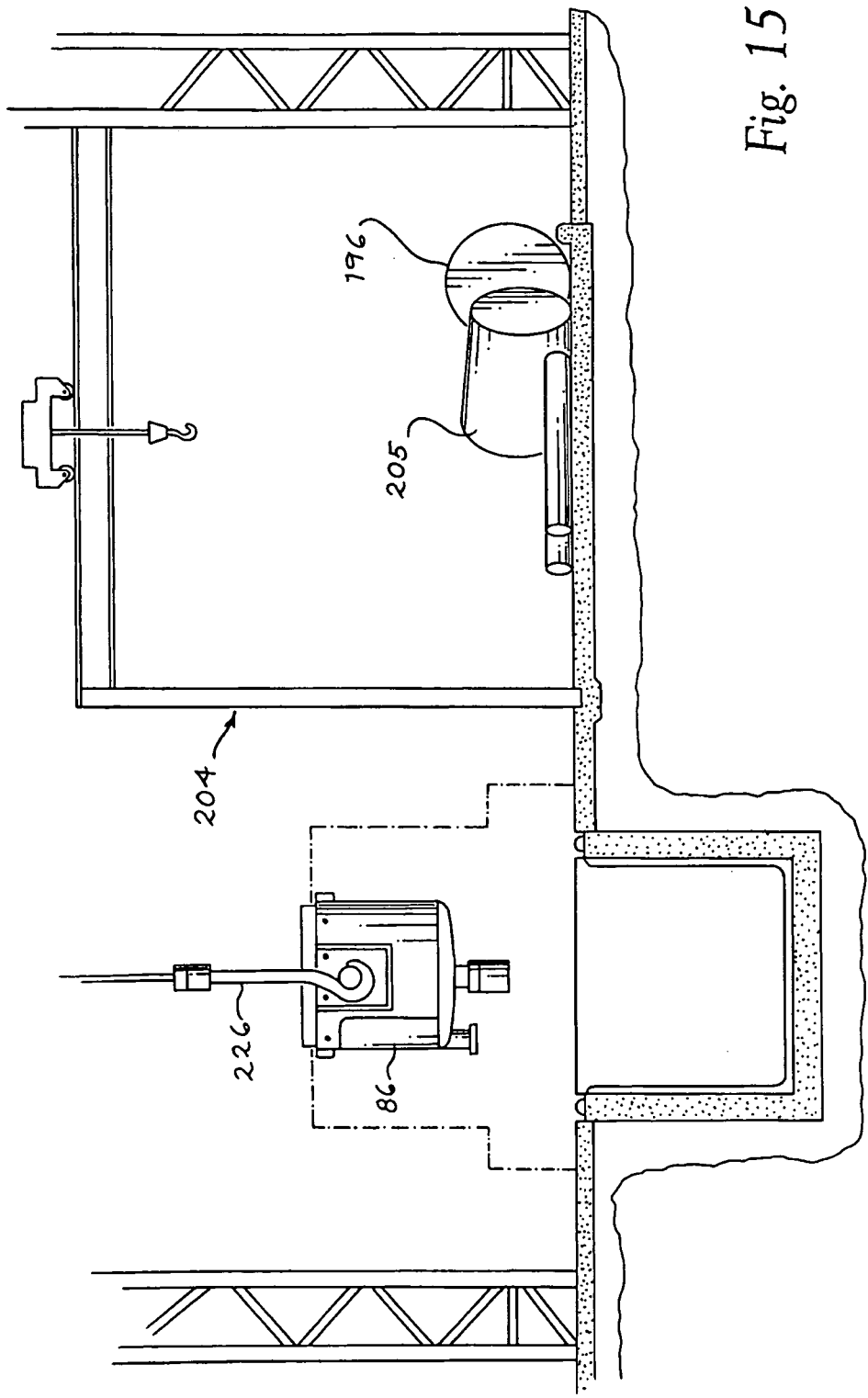
FIG. 15 illustrates the mold stripping area adjacent to the teeming pit.

A solidified vacuum degassed ingot 205 is shown in FIG. 2C in transit by crane to the mold stripping area shown in FIGS. 1C and 15. In the expanded view of FIG. 15 the stripped ingot 205 is shown laying on its side with its associated ingot mold 196 also laying on its side.

A crane 226 carrying a teemed ladle 227 which now holds only several tons of carryover steel and slag is shown poised above the mold stripping area where, after having teemed the heat into ingot mold 196, it is preparing to teem the few remaining tons of steel in the ladle into the small pyramid mold 207, and the slag into the slag dumping area 206, see FIG. 1C, either by using the ladle slide gate or tipping the ladle while resting on its side on the ground using hook eye 208 of FIG. 10 as a raising point. Following solidification in pyramid mold 207 the individual pyramid ingots, here six in number if all individual molds are filled, will be crane lifted onto transfer car 209 for transfer by rail 13 to the scrap house 11.

In like manner, the still hot ingot 205 will be placed on the transfer car 209 and conveyed to a heating furnace to heat the hot ingot to deformation temperature in the forge department preparatory to going to the forge press.

Referring now to FIGS. 1C, 2C and 15, a stripped ingot 205, which has cooled to room temperature in the mold stripping area, has its hot top sawn off and the outside oxidized surface removed by grinding or machining to form a VAR electrode ingot in preparation for further processing at the vacuum arc remelt station shown in detail at the left end of FIG. 2C. Thereafter an attachment stub 210 is welded to the smooth cut off end, thereby forming a vacuum arc remelt electrode 211. A copper crucible 212 is placed into the water jacket tank portion 218 of a vacuum arc remelt unit shown in FIG. 2C. The exposed end of the VAR electrode is clamped to the lower end 213 of the VAR ram. The VAR ram is connected to a DC power source 214 with the ram sliding in a vacuum tight opening in the cover 215 of the VAR unit. When the DC current is turned on the bottom end of the VAR electrode 211 melts and forms a shallow pool 219 which rapidly solidifies from the bottom up as the cooling water conveys away the heat from the molten pool of steel in the VAR crucible. The melting of the VAR electrode continues until the VAR electrode has been entirely consumed and a VAR ingot formed from it. At this time the VAR ingot is further processed, usually by forging and required heat treatment.

The use and operation of the invention is as follows.

It will be assumed that a first heat of steel is to be made at the start of a campaign. (It will be understood that the word campaign is used in the sense it is generally understood in the steel industry, that is, the number of heats which can be made in an arc furnace before relining of the furnace is required.) It will also be assumed that a vacuum oxygen decarburized vacuum arc remelt product has been ordered by a customer. Further, it will be assumed that a vacuum oxygen decarburized vacuum arc remelted ingot of about 75 tons is the required end product of the melt shop portion of a full production sequence; that is, melting followed by subsequent processing which concludes in an ingot ready for the next phase of the steel making process, usually forging.

The invention will be applicable to virtually any size commercial steel making process. For purposes of description, and solely by way of example, it will be assumed that the capacity of the arc furnace will be about 75 to 115 tons. For specific descriptive purposes a heat size of on the order of about 75 tons will adequately describe the invention.

Referring first to FIG. 1A, a first scrap charging bucket 21 which sits on scrap car 15 which runs on rails 17 has scrap 12 loaded into it by any suitable conventional means, such as a temporary magnet on a scrap crane. While bucket 21 is being loaded, arc furnace cover 35 of arc furnace 30 will be swung to the dotted position of FIG. 1A. As soon as cover 35 is swung about its pivot 36 into the above described open position, the arc furnace bowl 31, shown best in FIG. 2A, will be open to receive scrap. At this time scrap crane 63, FIG. 2A, lifts first scrap charging bucket 21 with the crane hook 64 hooked into lifting bracket 25 of bail 23, which bail is rotatably connected to bucket 21 at pivots 29. The scrap crane lifts first charging bucket 21 to the elevated position shown in FIG. 2A. When the bottom of bucket 21 is opened scrap 12 is charged into the bowl 31 of the arc furnace 30.

It will be understood that in the first charge of the arc furnace in a heat the scrap 12 will include small pieces such as flashings and bushelings so that the bottom refractories in the furnace bowl 31 will not be damaged from heavy piece such as hot tops in the dropped scrap charge. There will be a heel of molten steel in the furnace left over from the preceding heat, said heel comprising sufficient tons of hot metal to, firstly envelop the scrap charge including large pieces and, secondly, to cushion the impact of large pieces of solid scrap on the refractory bottom of the furnace. The large pieces will have been transported back to the scrap house by the scrap rail system 13, FIG. 1C., which rail system includes transfer car 209, following completed downstream steps of the process. The solid pieces will include large cut off hot tops following solidification of the ingots in both VAR and non-VAR heats and small ingots from pyramid molds 207.

After the first charge of scrap 12 from first charging bucket 21 is charged into the open bowl 31 of the furnace the scrap crane will move from its elevated FIG. 2A position upstream to engage the lifting bracket 24 on the second charging bucket 20 which runs on rails 16.

It will be understood that immediately after the charging bucket 21 is emptied into the furnace the arc furnace cover 35 will move to the arc-operative position shown by the solid lines of FIG. 1A and an arc struck between the furnace electrodes 45, 46 and 47 and the metal in the furnace bowl. In the arc operating position, the stationary intake elbow 58 of the arc furnace ducting system 55 will be aligned with, though spaced from, the off take fume elbow 56 from the top of cover 35 as best seen in FIGS. 1A and 3. From FIG. 1A it will be seen that the slightly curved, discharge end flange 57 of fume off take elbow 56 will be directly aligned with the flat intake circular flange 59 of the stationary intake elbow 58 of the ducting system 55. Powerful blowers, not shown, in the ducting system 55 will ensure that all the fumes in the arc furnace 30, including chemical reaction fumes in the bowl 31 and any inward seepage from around the cover 35 and bowl 31, will be directed into the ducting system 55 so the melt shop environment will not be contaminated by furnace fumes. Indeed, a slight pressure drop will occur within the furnace.

As soon as the scrap from first charging bucket 21 is melted, the arcs are terminated, and then the electrodes are elevated to the clearance position shown in phantom in FIG. 3 and the cover 35 swung out to its open position shown in FIG. 1A. While the cover is being swung to the open position scrap crane 63 will lift the second scrap bucket 20 from its position on scrap car 14 in FIG. 1A to the charging position of FIG. 2A, and then the scrap in scrap bucket 20 will be charged on top of the molten metal in the furnace. Thereafter the arc furnace cover 35 will be swung from the charging, phantom line position of FIG. 1A to the solid line, closed position of FIG. 1A, the electrodes 45, 46 and 47 lowered to the operating position shown in solid lines in FIG. 3, and the arcs and ducting system 55 restarted.

Both before and after charging from second charging bucket 20 occurs, samples will be taken from sampling device 50, and also temperature. In this phase of processing, carbon and slag forming materials, particularly lime, will be added along with desired alloys depending on the values reported from samples. Further, oxygen and carbon will be added to the melt in the furnace by the carbon and oxygen injection system 53.

During all the above described operations a spare scrap charge bucket 26 will be loaded and waiting for transference to an open scrap car and thence to the furnace should the need arise.

Referring now to FIG. 1A and, particularly, FIG. 2A, a tapping ladle car 70, which rides on tracks 71, and carries an empty, unheated tapping ladle 72, which includes trunnions 73, is there shown. The ladle 72 is positioned beneath the furnace tap hole 75, which tap hole is controlled by the furnace slide gate 84. To tap the melt in the furnace into the tapping ladle 72, the furnace rocker piston 83, FIG. 2A, is actuated to tilt the furnace 30 from the arc operative position of FIG. 5C to the tapping position of FIG. 5A via rack and pinion 32, 33, which tapping position is about 15° counterclockwise from the operating position of FIG. 5C. After tapping the furnace 30 may be tilted clockwise to the position of FIG. 5B and the furnace slag removed through the furnace slag off door 52. Since the slide gate permits nearly all the molten metal to be tapped (if desired) there will be little metal lost at slag off though, as stated above, preferably at least about 5-15 tons of metal are left in the furnace to form a heel. In any event the great bulk of the weight of the steel which will eventually be teemed is formed in the arc furnace.

Tapping ladle 72, prior to tapping, is heated by a preheat lance 76 so that the tapped metal from the furnace melt will not be unduly cooled when it contacts the tapping ladle. The increased wall temperature of the tapping ladle 72 is prolonged by a preheat shield indicated generally at 77 on the top of the ladle. The preheat shield is formed from a backing plate 78 to which a high heat resistant refractory insulation layer 79 is attached. The preheat shield 77 is raised and lowered as required by the hook 80 of a crane, hook 80 engaging shield bracket 81. The preheat shield 77 is placed over a tapping ladle 72 for the maximum of time that the tapping ladle is required to wait for tap to begin. As a consequence the tapping ladle 72 will cool only minimally during its wait time before tapping begins. In a tapped heat size of about 75 tons approximately 1½ tons of lime, and sufficient pounds of alloys to bring the alloy content up to about 60% of the final required alloy content in many heats, will be made from the alloy feed assembly 82 directly into the tapping ladle 72. As is exceedingly well known in the art, the tapped melt will contain undesirable elements including hydrogen.

After the heat in arc furnace 30 has been tapped into tapping ladle 72, tapping ladle car 70 with the tapped melt is moved downstream to its terminus 71a shown at the left side of FIG. 2A. At this point the filled ladle, now indicated at 86, will be lifted by crane 85 from the tapping car 70 onto a ladle metallurgical furnace (or LMF) car 87.

The LMF car 87 will be preheated by a preheat lance 89 shown in the upstream position of LMF car 87 in FIG. 1B. Slag will be added through the slag chute 65 which is also located in the LMF upstream position of FIG. 1B.

While necessary conditioning will be taking place at the LMF upstream position of FIG. 1B, the LMF will be prepared for LMF processing. The LMF electrodes 91, 92 and 93, shown best in FIG. 1B, are retracted a distance sufficient to permit ladle 86 and LMF car 87 to move into position in the LMF station under the electrodes 91, 92 and 93.

LMF roof 90 is shown best in FIGS. 8 and 9. The electrodes 91, 92 and 93 receive from power source 94 power through leads 95, 96, and 97 shown best in FIG. 1B. The electrodes snugly but movably reciprocate in the openings 98 in LMF center plate 99. Both vertical and horizontal portions of the roof 90 are water cooled as shown best in FIG. 9. The lower structural portion of roof 90 terminates in a circular bottom flange 116 which mates with, and rests upon, a circular upper flange 117 on ladle 86. A large volume of fumes are generated in the space between the ladle 86 and the LMF roof 90 and these fumes will be conducted by a path indicated by the arrows in FIGS. 8 and 9 to the off take ducting of the system which connects into the bag house 115 shown in FIG. 1A. A flapper is indicated a 100 in FIG. 2B which will enable temperature and chemical analyses to be made of the heat in ladle 86 at one or more times in the processing at the LMF station.

Chemical additions, temperature and sampling systems are shown best in FIGS. 6, 7, 8 and 9.

In FIG. 6 an oxygen lance for the sub-surface addition of oxygen to the melt is indicated at 107, which Figure shows the lance in operative position in solid lines and in the retracted, or inoperative, position in phantom lines.

Figure 7:
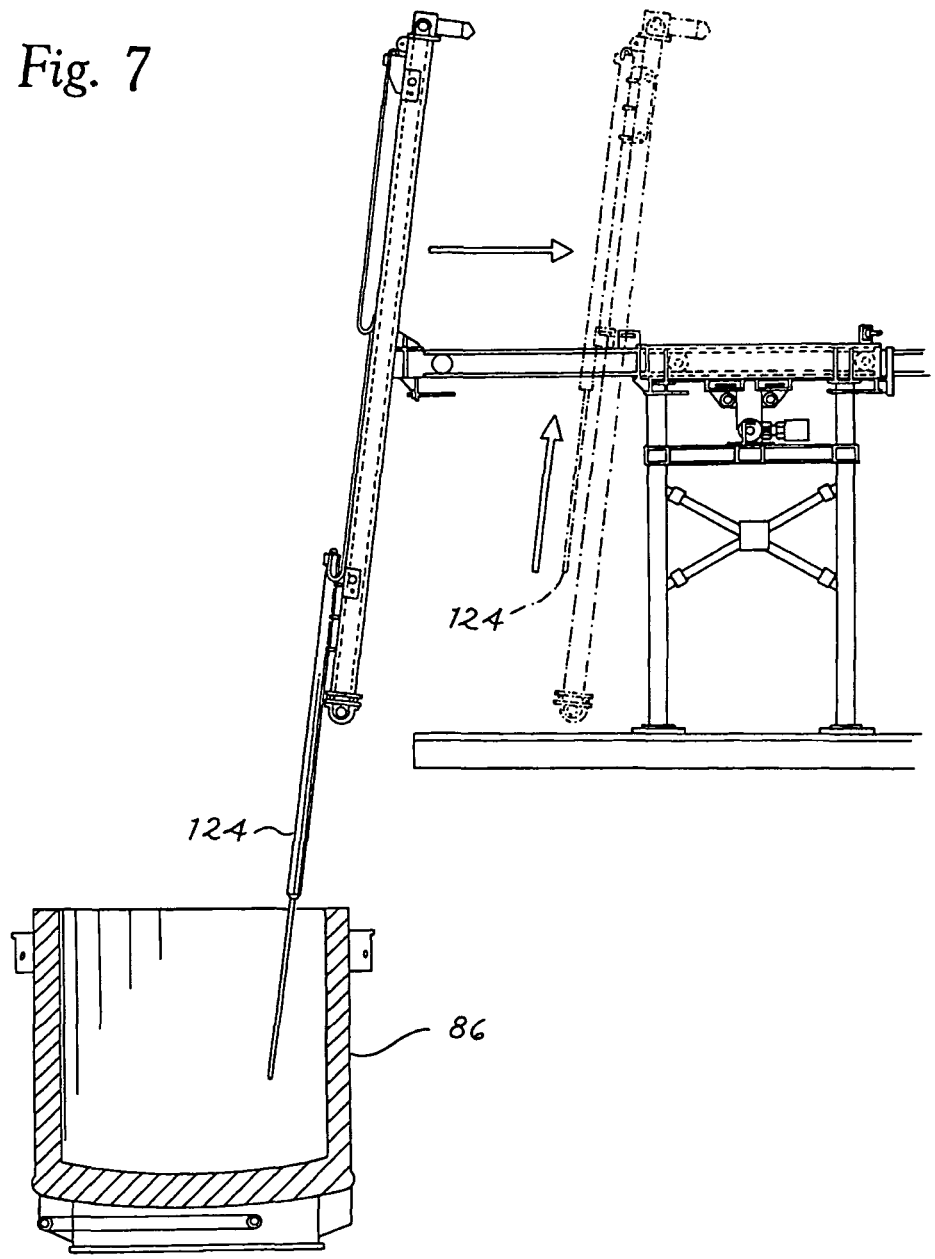
FIG. 7 is a partial schematic view of the temperature and sampling features of the ladle metallurgical furnace component of the invention.

In FIG. 7 temperature or, alternatively, a sampling system indicated generally at 124, is shown in operative position in solid lines, and in retracted position in phantom lines.

In FIG. 8 the alloy wire addition system 108 will be seen to include, in this instance, two alloy feed wires 110 and 111 which are moved into the alloy wire feed funnel 112 by wire drive rollers 109. The elongated spigot of the feed wire funnel 112 directs an alloy feed wire, here wire 110, through wire feed tube 113 toward the heat in ladle 86. A flapper valve in cover 90 (not shown) will open to enable the wire feed tube 113 to pass through opening 114 in cover 90.

Solid alloy materials in particulate form will be made by the bulk alloy chute system indicated generally at 101 in FIG. 9. Collecting chute 102 is a feed conduit from one or more overhead alloy hoppers. Collecting chute 102 empties into inclined chute 103 which in turn passes through inclined chute opening 104 in cover 90 whereby bulk alloys will be charged directly onto the melt. An alloy chute opening seal plate is indicated at 105, which plate can be sealed by any suitable means to cut off communication between the space beneath the cover 90 and the bulk alloy chute system 101 so that processing can occur without significant fume diversion into the bulk alloy chute system 101 when seal plate 105 is opened to admit alloys to the melt.

The cover 90 has a roof water cooling system indicated at 119. A wire feed slide plate system is indicated generally at 120, the slide plate system having a flap plate 121 under the control of a flap plate control system 122 which, when opened, permits the wire feed tube 113 to enter the cover 90 so that the exit end of the wire feed tube 113 can be brought close to the surface of the melt to ensure contact of the alloy wire, which may be aluminum for example, with the heat.

After alloy additions have been made to the LMF and the temperature of the heat brought to a desired level, which will, for example, be on the order of about 3000° F., the cover 90 and electrodes 91, 92 and 93 will be elevated so that LMF car 87 and ladle 86 carried by it will be moved to the downstream terminus position represented by stop 123 in FIG. 2B which is just next to the vacuum treatment station indicated generally at 126. The vacuum treatment station includes a vacuum tank base 127 and a vacuum tank cover assembly indicated generally at 128. The cover assembly 128 includes a tank top 129 which is movable in the vertical direction by tank top lift jacks 131 as represented by the vertical arrow in FIG. 2B. Tank top 129 and its associated top lift jacks 131 are carried by a wheeled gantry top support indicated generally at 130 shown in greater detail in FIG. 12. The gantry top support includes a gantry platform 132, see FIG. 12, having wheels 133, 134 which roll on gantry tracks 134, 135 best shown in FIG. 12. One of two oppositely positioned ladle saddles are indicated generally at 138 in FIG. 12 which Figure shows the vacuum tank, indicated generally at 125, in an open, empty, downstream condition. Ladle projections are indicated at 139, see FIG. 2B, on opposite sides of ladle 86, the ladle projections being arranged to rest upon the ladle saddles 138 while ladle 86 is in the vacuum treatment station phase of the process. A vacuum tank sight port is indicated at 140, see FIGS. 1B and 10, which penetrates the tank top 129 at a position which permits an operator to observe the intensity of the CO boil in ladle 137, see FIG. 10. An alloy and charge material system is indicated at 141 and a wire feed system at 142 in FIG. 1B, which system 142 may be similar to the wire addition system 108 of FIGS. 1B, 8 and 9. A temperature and sampling port is indicated generally at 143 in FIG. 1B. A central port cover plate is indicated at 144, which cover plate will be in very tight sealed engagement with the tank top 129 during low vacuum operation. In this context low vacuum operation is considered to be an absolute pressure of less than 1 torr during a significant portion of the vacuum degassing portion of the cycle. Tank top 129 has a bottom flange 144 at its lower edge, which bottom flange is smoothly machined to mate with a similarly machined top flange 145 which surrounds the upper edge of vacuum tank base 127. An O-ring seal 147 between smooth fitting flanges 145 and 146 will enable the vacuum tank 125 to routinely establish an absolute pressure of less than 1 torr on a continuous operating basis. The very low absolute vacuum will be preferably generated by a multistage steam jet ejector system which connects to vacuum tank 125 through tank atmosphere off take duct 149.

Ladle 86 is completely contained within the vacuum tank 125, as seen in FIG. 10, thereby exposing the entire periphery of the ladle, as well as the surface of the heat, to the vacuum, and, in addition, is elevated a substantial distance above the bottom of the tank by a structural base indicated generally at 151. The height of the base is so selected that if a breakout occurs during treatment of a maximum heat size, the ladle will not be welded to the bottom of the tank and can thus be lifted up and out of the way while the tank bottom is repaired.

Should the steel maker wish to make a vacuum oxygen decarburized heat of steel, either VAR or non-VAR quality, the tank top 129 is modified to receive an oxygen lance 153. The lance 153 enters the tank 125 through a port which is opened when cover plate 144 is removed. The lance passes through a slide structure 154 with a tight fit so that the steam jet ejector system will be able to maintain a sub-atmospheric pressure in the system, thus preventing entry of ambient air into the tank enclosure in an amount sufficient to counteract to any appreciable degree contact of the melt with ambient atmosphere.

An auxiliary heat shield is indicated at 156 for use particularly during processing which will require vacuum oxygen decarburization. A refractory cover plate 157 having a central opening 158 will contain the vigorous boil during vacuum oxidation decarburization cycles. It will be understood that cover plate 157 will usually not be needed in heats which do not call for vacuum oxygen decarburization. It will be noted that the metal shell of the ladle will contain weep holes 155 so that any moisture in the refractory will be pulled out of the refractory by the very low vacuum. The combination of the very smooth cover and tank flanges 145, 146 and the O-ring seal 147 and the exposure of the weep holes to the very low vacuum will ensure that no significant moisture which would contain deleterious hydrogen will be present in the system, thus making possible final hydrogen gas contents of less that 2.2 ppm, and often less than 1.0 ppm so that ultra clean steel suitable for airplanes and space application will always result.

This is in contrast to systems in which the vacuum station includes only a cover which is placed on the upper rim of a ladle, thus making the ladle a portion of the vacuum tank enclosure. In such systems an absolute vacuum seal cannot be guaranteed between the cover and upper rim of the ladle due to the presence, often unnoticed, of particles on these surfaces which prevent a high vacuum seal from being formed. And, in addition, the possibility of moisture containing air remaining in the refractory due to the absence of weep holes which permit such moisture to enter the refractory is always present. This is in contrast to systems in which the vacuum station includes only a cover which is placed on the upper rim of a ladle, thus making the ladle a portion of the vacuum tank enclosure. In such systems an absolute vacuum seal cannot be guaranteed between the cover and upper rim of the ladle due to the presence, often unnoticed, of particles on these surfaces which prevent a high vacuum seal from being formed. And, in addition, the possibility of moisture containing air remaining in the refractory due to the absence of weep holes which permit such moisture to enter the refractory is always present.

Referring now to FIG. 11, it will be seen that a vigorous boil derived from gas purging is provided. A line 159 from a source of purging gas, preferably argon, connects at a junction indicated generally at 160 to a first plug feeder line 161 and a second plug feeder line 162 which terminate at first and second refractory purging plugs 163 and 164 respectively located in the bottom of the ladle. It will be understood that when the molten metal is stirred by the volumetric expansion of the purging gas, which will be on the order of about 1400 times due to the effect of the Charles and Boyles laws of gas expansion, a current will be sent up in the molten steel having an upward component above the purging plugs and a downward component on the opposite side of the ladle roughly indicated by the location of the teeming nozzle 166 in FIG. 11. As molten metal from locations remote from the surface reach the surface, the included deleterious gases in the molten metal such as hydrogen, oxygen and nitrogen, will be exposed to the very low pressure in the vacuum tank and will be discharged from the system through the off take duct 149.

The duration of the vacuum treatment will depend on the temperature of the metal at the start of treatment, the intensity of the boil and, during vacuum oxygen decarburization cycles, the quantity of oxygen added by lance 53 to the melt.

Following treatment at the vacuum treatment station 126 and removal of vacuum tank cover assembly 128 to the tank open position of FIG. 12, the ladle 86 will be crane lifted out of the vacuum treatment station 126 and placed on the ladle positioning frame structure 171 carried by the teeming car, indicated generally at 170, whose four wheels 191 ride on teeming track 190. Teeming car 170 moves downstream, to the left as seen in FIG. 1C, to the teeming pit station indicated generally at 192 preparatory to teeming into ingot molds 196, see FIG. 1C.

With the ladle 86 on the ladle positioning frame structure 171, the ladle is capable of movement in six directions in order to precisely position the ladle teeming nozzle 166 over the upper open flared end 195 of pouring trumpet 199 which projects upwardly above the level of track 190 as follows.

Teeming car 170 consists of a rigid base frame composed of two longitudinal side frames 178, 179 and two transverse cross members 186, 187. Vertical jack posts 182, 183, 184 and 185 extend upwardly from the four junctions of the longitudinal side frames 178, 179 and the transverse cross members 186 and 187.

The ladle positioning frame structure 171 consists of two longitudinal cradle base members 174, 175 and two transverse base cradle members 176, 177. The four sided ladle base so formed is moved upwardly and downwardly by jack means, two of which are indicated at 180, 181, the jack means being mounted on the vertical jack posts 182, 183, 184 and 185. Two slightly V-shaped transverse cradle members 172, 173 extend between longitudinal cradle base members 174, 175. The slightly V-shaped transverse cradle members 172, 173 are contoured to matingly receive the ladle projections 139 (not shown in FIGS. 13 and 14) so that ladle 86 is held stationary with the ladle base 174, 175, 176 and 177. Horizontal transverse positioning jack means 224 and 225 enable the cradle base 174, 175, 176 and 177 to be moved transversely with respect to the track 190.

Thus, by actuation of vertical jack means 180, 181 and transverse jack means 224 and 225, together with the movement of the teeming car 170 via the wheels 191 along track 190, the ladle teeming nozzle 166 can be moved in six directions to precisely position the nozzle 166 over the pouring trumpet 199.

The teeming pit is shown best in FIGS. 1C and 2C.

Ingot mold 196 rests on mold stool 197 which in turn rests on runner base 198. The channel in pouring trumpet 199 connects with runner base entry hole 203, which in turn connects with runner 202 in runner base 198, which in turn connects with ingot entry hole 200 in the mold base 197. A hot top is indicated at 201. A suitable mold coating material may be present in the ingot mold prior to teeming for the purpose of coating the inside surface of the ingot mold.

Following teeming, the ladle 86, which may have three to five tons of hot metal and about three tons of slag, will be crane lifted to the mold stripping area 204, see FIG. 1C, where the metal will be poured into pyramid mold 207 and the slag dumped into the slag dumping area 206. The empty ladle will then be crane lifted back to a preheat area adjacent the arc furnace 30 where it will be readied for a subsequent furnace tap. The teeming car 170 will be returned upstream to its starting location just downstream from the vacuum treatment station 126 where it will await the next ladle to be crane lifted out of the vacuum treatment station 126.

When the pigs in pyramid mold 207 solidify they will be crane lifted to transfer car 209 where they will be returned via scrap rail system 13 to the scrap house 11.

After ingot 205 has solidified in ingot mold 196, the ingot and its mold are transferred by crane to mold stripping area 204 where the mold and ingot are separated as seen best in FIG. 15. The hot top portion of the ingot remains on the ingot if the ingot is slated for conventional processing. The ingot is then loaded onto transfer car 209 and sent to the forging area where it will go initially to an annealing furnace.

If the ingot in the mold stripping station 204 is intended for vacuum arc remelt treatment, it is processed as follows.

From the mold stripping area 204 the ingot is crane lifted as seen in FIG. 2C to a cooling and sawing station 221 where the ingot is cooled to room temperature and the hot top cut off. Thereafter the surface of the ingot is formed into a near constant diameter at forming station 222 by grinding or machining to form, in effect, a vacuum arc remelt electrode 211.

An attachment stub 210 is welded to the smooth cutoff end of the VAR electrode 211. A copper crucible 212 will be then placed into the water jacket tank portion 218 of the VAR unit. The exposed end of stub shaft 210 is clamped to the lower end of the VAR ram 213 by a conductive coupling. The VAR ram is connected to a DC power source 214. The ram slides in a vacuum tight opening in the cover 215 of the VAR unit. After the cover 215 seals via seal 216 to tank portion 218 of the VAR unit, DC current will be conducted through the ram 213 and stub shaft 210 to strike an arc 217 to the bottom of the VAR crucible 212. The DC arc will melt the end of the VAR electrode 211 and the resultant molten metal forms a pool 219 in the copper crucible 212. The molten pool 219 is rapidly solidified from the bottom up as cooling water 220 surrounding the copper crucible 218 conveys away heat from the molten pool of steel 219 in crucible 218. The melting process will continue until the VAR electrode 211 is completely consumed and a new VAR ingot 223 has been created.

After the VAR electrode 211 had been fully melted, the DC current is terminated, the vacuum is terminated, and the cover 215 removed to expose a finished VAR ingot 223, shown partially completed in FIG. 2C. The attachment stub 210 is then uncoupled from the ram 213 and re-machined for use in a future VAR cycle. The bottom of the crucible will be unbolted from the crucible sides and the crucible is crane lifted off the VAR ingot 223. The completed VAR ingot is placed on transfer car 209 which will then move the ingot to the forging department.

A typical cycle time for a heat size of approximately 75 tons commencing with swinging the arc furnace cover 35 to a first charge position through completion of remelt of the recharge scrap, completion of tapping and return of the arc furnace to level position ready for swinging the furnace to a first charge position, will be about 1 hour and 45 minutes as follows.

It will be assumed that the tapping ladle has been preheated to approximately 2000° F. by preheat lance 76 prior to tapping and each charging bucket 20, 21 will be loaded with approximately 41½ tons of solid scrap.

|    |                                                                                                               | Approximate Time |
| -- | ------------------------------------------------------------------------------------------------------------- | ---------------- |
| 1. | Swing arc furnace cover from level position to charge position.                                               | 1 minute         |
| 2. | Charge the arc furnace with scrap charge No. 1 while adding approximately 1½ tons lime.                       | 5 minutes        |
| 3. | Swing arc furnace cover to melt position with off take from arc furnace cover aligned with stationary off take system. | 1 minute  |
| 4. | Run arcs to melt charge from the first bucket; turn off arcs.                                                 | 45 minutes       |
| 5. | Swing arc furnace cover to charge position.                                                                   | 1 minute         |
| 6. | Recharge arc furnace with scrap charge No. 2 while adding approximately 1½ tons lime.                         | 5 minutes        |
| 7. | Swing arc furnace to melt position with off take system aligned.                                              | 1 minute         |
| 8. | Melt recharge scrap.                                                                                          | 45 minutes       |
| 9. | Tap approximately 75 tons into tapping ladle at a temperature of approximately 3050° F. leaving a heel of about 5-7 tons. | 5 minutes |
| 10.| Return arc furnace and its cover to level position.                                                           | 1 minute         |

Down stream processing of the heat from level, covered condition through crane lift from the vacuum treatment station will require less than about 1 hour and 45 minutes so there will be no possibility of back up due to slowness of downstream operations. For example, the time in the LMF will be only about 35 minutes, or less, and the time at the vacuum treatment station will be only about 30 minutes.

The cycle time may approach or even slightly exceed two hours if 90 tons are to be teemed. The cycle time will however be less than directly proportional to the size of the heat due to arc furnace electrodes of up to 16 inches diameter and 75 to 90 MVA current. It will also be understood that the composition of the steel to be produced—from low alloy to high chromium stainless—will have insignificant impact on the cycle time.

Although a preferred embodiment of the invention has been disclosed, it will be apparent that the scope of the invention is not confined to the foregoing description, but rather only to the scope of the hereafter appended claims when interpreted in light of the relevant prior art.

The invention claimed is:

1. In a single arc furnace process of making
at least four types of steel, the steps of
providing a single arc furnace,
charging solid scrap into the single arc furnace in an amount sufficient to comprise at least a bulk of the weight of steel which is to be subsequently subjected to vacuum treatment,
adding heat to the solid scrap to melt the solid scrap to thereby form a melt containing carbon,
tapping at least the bulk of the melt from the single arc furnace into a tapping vessel to form a heat,
transferring the tapped heat from the arc furnace in the tapping vessel to a single ladle metallurgical station,
adding alloys to the tapped heat in the ladle metallurgical station in an amount sufficient to bring at least some constituents of the tapped heat up to desired constituent levels,
increasing the temperature of the heat at the ladle metallurgical station sufficiently to super-heat the heat with respect to a desired teeming temperature,
transferring the super-heated heat to a vacuum treatment station,
subjecting the super-heated heat to a vacuum and a purging gas in an amount sufficient to stir the super-heated heat so as to expose the surface of the heat, and also portions of the heat remote from the surface, to the vacuum whereby hydrogen and oxygen in the super-heated heat are removed from the heat by exposure of the heat to the vacuum,
terminating subjection of the heat to the vacuum and the purging gas at a time after degassing of the heat has occurred and the temperature of the heat has reached an acceptable teeming temperature,
immediately transferring the heat treated in accordance with the foregoing steps to a teeming station,
teeming a desired quantity of the treated heat into at least one primary mold at the teeming station, and
solidifying the teemed heat at the teeming station.

2. The process of claim 1 further characterized in that
the scrap charged into the arc furnace for the first heat of a plurality of heats exceeds the desired quantity of treated heat teemed at the teeming station, the excess scrap after tapping remaining in the arc furnace to form a heel, and
subsequently charging a quantity of scrap for a succeeding heat in a plurality of heats into the arc furnace in which the quantity of scrap is more or less than the quantity of treated heat to be teemed at the teeming station,
whereby the subsequent scrap charge plus at least a portion of the heel together with any subsequently added alloys comprise at least the desired quantity of treated heat to be teemed at the teeming station.

3. The process of claim 2 further including the step of
repeating the above steps until substantially no heel is left in the furnace.

4. The process of claim 3 further characterized in that
the quantity of scrap charged into the arc furnace sufficient to subsequently teem a desired quantity of treated heat includes an additional quantity of scrap sufficient to form a heel in the arc furnace for a succeeding heat.

5. The process of claim 1 further including the steps of
thereafter forming the teemed vacuum treated steel into a vacuum arc remelt electrode, and
thereafter vacuum arc remelting the vacuum arc remelt electrode to form a vacuum arc remelt ingot.

6. The process of claim 5 further characterized in that
the vacuum arc remelt ingot is transferred to an annealing or forging station prior to cooling from the vacuum arc remelting.

7. The process of claim 1 further characterized in that
in addition to maintaining the subjection of the heat to the vacuum and the purging gas for a period of time sufficient to lower the content of hydrogen and oxygen in the heat to a desired degassed level,
the heat is contacted with oxygen in an amount sufficient to lower the carbon content of the heat to a desired level.

8. The process of claim 7 further characterized in that
the oxygen is in gaseous form when contacting the heat.

9. The process of claim 8 further characterized in that
the oxygen is blown against the upper surface of the heat.

10. The process of claim 8 further characterized in that
the initial point of contact of the gaseous oxygen with the heat occurs at a location beneath the surface of the heat.

11. The process of claim 7 further characterized in that
following contact of the heat with oxygen, transferal of the treated heat to a teeming station, teeming of a desired quantity of treated heat into at least one primary mold at the teeming station, solidifying the teemed melt at the teeming station to form a vacuum treated ingot, and forming the vacuum treated ingot into a vacuum arc remelt electrode,
the vacuum arc remelt electrode is remelted in a vacuum arc remelt unit to form a vacuum arc remelted ingot.

12. The process of making steel of claim 1 further including the step of
exposing the entire periphery of the vessel containing the superheated melt, as well as the surface of the melt, to the vacuum at the vacuum station.

13. The process of making steel of claim 12 further characterized in that
in addition to maintaining the subjection of the heat to the vacuum and the purging gas for a period of time sufficient to lower the content of hydrogen and oxygen in the heat to a desired degassed level,
the heat is contacted with oxygen in an amount sufficient to lower the carbon content of the heat to a desired level.

14. The process of making steel of claim 1 further including the steps of
preheating the tapping vessel prior to tapping the melt from the furnace into the tapping vessel.

15. The process of making steel of claim 14 further characterized in that
the tapping vessel is preheated to a temperature of on the order of about 2000° F.

16. The process of making steel of claim 14 further including the steps of
covering the preheated tapping vessel with a refractory cover following preheat and
removing the cover prior to tap.

17. In a system for making steel,
an arc furnace for forming a melt of steel which contains an undesirably high level of hydrogen,
a ladle metallurgical furnace,
means for forming a melt of steel in said arc furnace over a period of time,
means for tapping a melt of steel from said furnace into a tapping vessel having bottom pouring means to thereby form a heat of steel,
means for transferring the tapping vessel to the ladle metallurgical furnace,
a vacuum treatment station,
means for transferring the heat of steel containing undesired elements including hydrogen in the tapping vessel in the ladle metallurgical furnace to the vacuum treatment station,
said vacuum treatment station having a vacuum tank which completely encloses the tapping vessel whereby the entire periphery of the tapping vessel and the heat contained in said tapping vessel as well as the surface of the heat in the tapping vessel are exposed to a sub-atmospheric pressure low enough to decrease the hydrogen content of the heat of steel to a desired level,
said vacuum treatment station further including means for adding oxygen to the heat while the heat is exposed to sub-atmospheric pressure,
a teeming station,
means for transferring the tapping vessel from the vacuum treatment station to the teeming station after the heat of steel contained therein has had its hydrogen content decreased to the desired level, and
means for teeming the heat of steel in the tapping vessel into a receptacle at the teeming station,
said means for teeming including ingot bottom pouring means,
said ingot bottom pouring means including a runner system having a pouring trumpet,
said means for transferring the tapping vessel to the teeming station including means for moving the bottom pouring means of the tapping vessel in six directions for alignment with the pouring trumpet,
said ladle metallurgical furnace and the vacuum treatment station together having a capacity to heat and treat the steel in said ladle metallurgical furnace and said vacuum treatment station for a period of time which, when added to the transferring times, is less than the time required to form a melt ready for tapping in the arc furnace,
whereby a production rate of the system is limited solely by the melting capacity of the arc furnace.

18. The system for making steel of claim 17 further including
means for converting the steel formed at the teeming station into a vacuum arc remelt electrode,
a vacuum arc remelt station, and
means for converting the vacuum arc remelt electrode into a vacuum arc remelt ingot in the vacuum arc remelt station.

19. The system for making steel of claim 17 further characterized in that
the vacuum treatment station includes means for adding oxygen to the heat while the heat is exposed to sub-atmospheric pressure, and further including
means for converting the steel formed at the teeming station into a vacuum arc remelt electrode,
a vacuum arc remelt station, and
means for converting the vacuum arc remelt electrode into a vacuum arc remelt ingot in the vacuum arc remelt station.

20. In a system for making steel,
an arc furnace having a melting capacity sufficient to form a melt of steel of a size suitable for subsequent treatment in a ladle furnace and a vacuum treatment station,
a ladle metallurgical furnace, means for forming a melt of steel in said arc furnace,
means for tapping a melt of steel from said furnace into a tapping vessel to form a heat of steel having hydrogen contained therein,
means for transferring the tapping vessel to the ladle metallurgical furnace during a first transfer time,
a vacuum treatment station,
means for transferring the heat of steel in the tapping vessel in the ladle metallurgical furnace to the vacuum treatment station during a second transfer time,
said vacuum treatment station having a vacuum tank which completely encloses the tapping vessel whereby the entire periphery of the tapping vessel and the heat contained in said tapping vessel as well as the surface of the heat in the tapping vessel are exposed to a sub-atmospheric pressure low enough to decrease the hydrogen content of the heat of steel to a desired level,
the vacuum treatment station further including means for adding oxygen to the heat while the heat is exposed to sub-atmospheric pressure,
a teeming station,
means for transferring the tapping vessel from the vacuum treatment station to the teeming station after the heat of steel contained therein has had its hydrogen content decreased to the desired level during a third transfer time,
means for teeming the heat of steel in the tapping vessel into a primary receptacle at the teeming station,
said ladle metallurgical furnace and the vacuum treatment station together having a capacity to heat and treat the steel in said ladle metallurgical furnace and said vacuum treatment station for a period of time which, when added to the transferring times, is less than the time required to form a melt ready for tapping in the arc furnace,
whereby a throughput of the system is limited solely by the melting capacity of the arc furnace.

21. The system for making steel of claim 20 further characterized
firstly in that the tapping vessel has bottom pouring means,
secondly in that the means for teeming includes ingot bottom pouring means,
said ingot bottom pouring means including a runner system having a pouring trumpet, and
thirdly the means for transferring the tapping vessel to the pouring station includes means for moving the bottom pouring means of the tapping vessel in six directions for alignment with the pouring trumpet.

22. In a system for making steel,
an arc furnace having a melting capacity sufficient to form a melt of steel,
a ladle metallurgical furnace,
means for forming a melt of steel in said arc furnace,
means for tapping a melt of steel from said arc furnace into a tapping vessel to thereby form a heat of steel containing an undesirably high hydrogen content,
means for transferring the tapping vessel to the ladle metallurgical furnace during a first transferring time,
a vacuum treatment station,
means for transferring the heat of steel in the tapping vessel in the ladle metallurgical furnace to the vacuum treatment station during a second transferring time,
said vacuum treatment station having a vacuum tank which completely encloses the tapping vessel whereby the entire periphery of the tapping vessel and the heat contained in said tapping vessel as well as the surface of the heat in the tapping vessel are exposed to a sub-atmospheric pressure low enough to decrease the hydrogen content of the heat of steel to a desired level,
a teeming station,
means for transferring the tapping vessel from the vacuum treatment station to the teeming station after the heat of steel contained therein has had its hydrogen content decreased to the desired level during a third transferring time, and
means for teeming the heat of steel in the tapping vessel into a primary receptacle at the teeming station,
said ladle metallurgical furnace and the vacuum treatment station together having a capacity to heat and treat the steel in said ladle metallurgical furnace and said vacuum treatment station for a period of time which, when added to the transferring times, is less than the time required to form a melt ready for tapping in the arc furnace,
whereby a throughput of the system is limited solely by the melting capacity of the arc furnace,
the vacuum treatment station including means for adding oxygen to the heat while the heat is exposed to sub-atmospheric pressure, and further including
means for converting an ingot formed in the primary receptacle at the teeming station into a vacuum arc remelt electrode,
a vacuum arc remelt station, and
means for converting a vacuum arc remelt electrode into a vacuum arc remelt ingot in the vacuum arc remelt station.

23. The system for making steel of claim 22 further characterized
firstly in that the tapping vessel has bottom pouring means,
secondly in that the means for teeming includes ingot bottom pouring means,
said ingot bottom pouring means including a runner system having a pouring trumpet, and
thirdly the means for transferring the tapping vessel to the pouring station includes means for moving the bottom pouring means of the tapping vessel in six directions for alignment with the pouring trumpet.

* * * * *